(12) United States Patent
Tsutsumi

(10) Patent No.: US 7,672,061 B2
(45) Date of Patent: Mar. 2, 2010

(54) ZOOM LENS AND IMAGING DEVICE

(75) Inventor: Katsuhisa Tsutsumi, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/031,566

(22) Filed: Feb. 14, 2008

(65) Prior Publication Data
US 2008/0239504 A1  Oct. 2, 2008

(30) Foreign Application Priority Data
Mar. 26, 2007  (JP) .............. P2007-079231

(51) Int. Cl.
G02B 15/14 (2006.01)
(52) U.S. Cl. ............ 359/676; 359/794
(58) Field of Classification Search ........ 359/676, 359/794
See application file for complete search history.

(56) References Cited

U.S. PATENT DOCUMENTS 6,577,452 B2 * 6/2003 Ohtake et al. ............ 359/693
2005/0275735 A1 * 12/2005 Nanjo ............ 348/240.3

FOREIGN PATENT DOCUMENTS

| JP | 7-1337 B2 | 1/1995 |
|---|---|---|
| JP | 2711717 B2 | 10/1997 |
| JP | 10-3036 A | 1/1998 |
| JP | 3376171 B2 | 11/2002 |

* cited by examiner

*Primary Examiner*—Joseph Martinez
(74) *Attorney, Agent, or Firm*—Birch, Stewart, Kolasch & Birch, LLP

(57) ABSTRACT

A zoom lens comprises: a stationary group that is stationary at the time of variable power; and a variable power group, disposed on an image side of the stationary group, that makes a variable power operation by moving in an optical axis direction at the time of variable power, wherein the stationary group comprises: a first lens group including a negative meniscus lens and a positive lens and having a positive refractive power as a whole; and a second lens group, disposed on the image side of the first lens group, including: a negative lens group including a negative meniscus lens and a positive lens; and a positive lens group including at least one positive lens, in order from an object side, the second lens group having a positive refractive power as a whole.

13 Claims, 22 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 1

WIDE-ANGLE END

MIDDLE

TELESCOPIC END

EXAMPLE 2

WIDE-ANGLE END

MIDDLE

TELESCOPIC END

EXAMPLE 3

EXAMPLE 4

WIDE-ANGLE END

MIDDLE

TELESCOPIC END

EXAMPLE 5

WIDE-ANGLE END

MIDDLE

TELESCOPIC END

EXAMPLE 6

WIDE-ANGLE END

MIDDLE

TELESCOPIC END

EXAMPLE 7

WIDE-ANGLE END

MIDDLE

TELESCOPIC END

EXAMPLE 8

WIDE-ANGLE END

MIDDLE

TELESCOPIC END

EXAMPLE 9

WIDE-ANGLE END

MIDDLE

TELESCOPIC END

EXAMPLE 10

WIDE-ANGLE END

MIDDLE

TELESCOPIC END

ZOOM LENS AND IMAGING DEVICE

BACKGROUND OF THE INVENTION

1. Field of the Invention

The present invention relates to a zoom lens and an imaging device, and more particularly to a zoom lens which is suitable to be mounted on a television camera or video camera and an imaging device having the zoom lens.

2. Description of the Related Art

In the related art, a zoom lens of four group constitution mounted on the television camera or video camera is well known. The zoom lens of four group constitution has a first group having a positive refractive power, a second group having a negative refractive power and becoming a variable power group by moving at the time of variable power, a third group having a positive or negative refractive power and correcting a variation in the image point position caused by the variable power, and a fourth group having a positive refractive power in order from an object side, for example.

In JP-B-7-1337, a zoom lens which comprises a first group having a positive refractive power, a second group having a negative refractive power, a third group having a positive refractive power, and a fourth group having a positive refractive power in order from an object side, and achieves the variable power by moving the first group, the third group and the fourth group was described. The first group of the zoom lens as described in JP-B-7-1337 has a negative meniscus lens, a positive lens, a compound lens having a positive refractive power, and a positive lens which are arranged in order from the object side.

In JP-B-2711717, a zoom lens which comprises a first group having a positive refractive power, a second group having a negative refractive power, a third group having a positive refractive power, and a fourth group having a positive refractive power in order from an object side, and achieves the variable power by moving all the four groups was described. The first group of the zoom lens as described in JP-B-2711717 has a negative meniscus lens, a positive lens, a compound lens having a positive refractive power, and a positive lens which are arranged in order from the object side.

In JP-B-3376171, a zoom lens which has a first group having a positive refractive power, a second group having a negative refractive power for variable power, a third group for correcting an image surface variation caused by the variable power, and a fourth group having an image formation operation in order from an object side was described. The first group of the zoom lens as described in JP-B-3376171 has a front group having a negative refractive power and a back group composed of a compound lens having a positive refractive power and a positive lens which are arranged in order from the object side.

In recent years, there is a demand that the zoom lens mounted on the television camera or video camera has a higher performance, and further is reduced in size as the camera has a smaller size. Also, there is a higher demand for the zoom lens having a high variable power ratio of 20 times or more as the needs are diversified.

The zoom lenses as described in JP-B-7-1337 and JP-B-2711717 have a variable power ratio as low as about 4 to 5 times, and can not meet the requirement of a high variable power ratio. Though the zoom lens having high variable power ratio was described in JP-B-3376171, there is a room for improvement in the respects of smaller size and higher performance.

Generally, the zoom lens comprises a variable power group taking charge of the variable power, and a first group disposed on an object side of the variable power group, in which the variable power is achieved by the variable power group which scales the focal length of this first group. The first group has great influence on the aberration or aberration due to a variation of the focal length, and this influence is more remarkable at the higher magnification, whereby it is required to correct the aberration for the zoom lens more strictly than the low power zoom lens. Accordingly, it is an important subject how the first group is constituted in the zoom lens.

On the other hand, since the focal length of each lens group is set to be shorter for the size reduction, the focal length of the first group is also set to be shorter. However, if the higher variable power ratio is obtained simply by making the focal length of each lens group shorter, a large aberration variation is caused by the variable power, whereby it is very difficult to obtain a high optical performance over the entire variable power range. Especially if the focal length of the first group is shorter, there was a problem that the residual secondary spectrum of longitudinal chromatic aberration abruptly increases near the telescopic end at the time of variable power.

In the zoom lens for television camera or video camera, if the variation of chromatic aberration is greater, the image quality of color image is extremely degraded. Therefore, in the zoom lens for these uses, it is required that the chromatic aberration is excellently corrected over the entire variable power range from the wide-angle end to the telescopic end.

SUMMARY OF THE INVENTION

In view of the above circumstances, it is an object of the invention to provide a zoom lens which has a small size, a high variable power ratio, and a small residual secondary spectrum of longitudinal chromatic aberration, and retains a high optical performance, and an imaging device with the zoom lens.

The present invention provides a zoom lens comprising: a stationary group that is stationary at the time of variable power; and a variable power group, disposed on an image side of the stationary group, that makes a variable power operation by moving in an optical axis direction at the time of variable power, wherein the stationary group comprises: a first lens group including a negative meniscus lens and a positive lens and having a positive refractive power as a whole; and a second lens group, disposed on the image side of the first lens group, including: a negative lens group including a negative meniscus lens and a positive lens; and a positive lens group including at least one positive lens, in order from an object side, the second lens group having a positive refractive power as a whole.

Herein, the "negative lens group" means the lens group having a negative refractive power as a whole, and the "positive lens group" means the lens group having a positive refractive power as a whole.

The zoom lens of the invention only needs to have the stationary group and the variable power group, and may comprise other groups, for example, an independent compensator group for correcting the image point variation at the time of variable power or a relay group having an image formation operation.

The stationary group of the zoom lens of the invention corresponds to the first group as described in the section of problems that the invention is to solve, and comprises a first lens group having a positive refractive power, a negative lens group having a negative refractive power and a positive lens group having a positive refractive power in order from an object side, as seen in groups by noting the refractive power. The stationary group before the variable power group may usually have a power arrangement of positive, positive and positive to make the focal length shorter, but the power arrangement of positive, negative and positive as in this invention can make the power of each group stronger than where all the groups are positive, and can make the refractive power of each lens stronger. Hence, since there is greater degree of freedom for allocating the refractive power of each lens suitably, it is more beneficial for the aberration correction. More particularly, the longitudinal chromatic aberration containing the residual secondary spectrum which is the concern in realizing the zoom lens of small size and the aberration at the reference wavelength can be corrected in well-balanced manner.

Since the zoom lens has a great aberration variation caused by the variable power as described in the section of problems that the invention is to solve, it is required that the chromatic aberration correction is made by the stationary group alone to excellently correct the chromatic aberration over the entire variable power range. If the first lens group and the negative lens group have the negative meniscus lens and the positive lens with the high effect of chromatic aberration correction, and the power arrangement is taken, as in the zoom lens of the invention, the optical system in which the chromatic aberration is excellently corrected by only the stationary group can be realized.

In the zoom lens according to the invention, it is preferable that an average value vn of Abbe numbers to the d-line of all the negative lenses in the stationary group and an average value vp of Abbe numbers to the d-line of all the positive lenses in the stationary group satisfy the following conditional expressions (1) and (2), $$vn > 40 \quad (1)$$

$$vp > 70 \quad (2)$$

In the zoom lens according to the invention, it is preferable that a focal length f1 of the first lens group and a focal length f2 of the second lens group satisfy the following conditional expression (3), $$0.7 < f1/f2 < 4.2 \quad (3)$$

In the zoom lens according to the invention, it is preferable that an average value vn of Abbe numbers to the d-line of all the negative lenses in the stationary group and an average value vp of Abbe numbers to the d-line of all the positive lenses in the stationary group satisfy the following conditional expression (4), $$vn + vp > 119 \quad (4)$$

In the zoom lens according to the invention, it may be possible that focus from an infinite distance object to a closest focusing distance object is achieved by moving only the second lens group of the stationary group in the optical axis direction.

The invention provides an imaging device comprising: the zoom lens according to the invention; and an image pickup device that picks up an image of a subject formed by the zoom lens. The imaging device may be a television camera, a video camera, or a surveillance camera, for example.

In the specification, the d-line (wavelength 587.6 nm) has the reference wavelength, unless otherwise specified. Also, in the specification, the "power" and the "refractive power" are used as the synonym.

DETAILED DESCRIPTION OF THE INVENTION

A zoom lens according to an embodiment of the present invention will be described below in detail with reference to the drawings.

Figure 1:
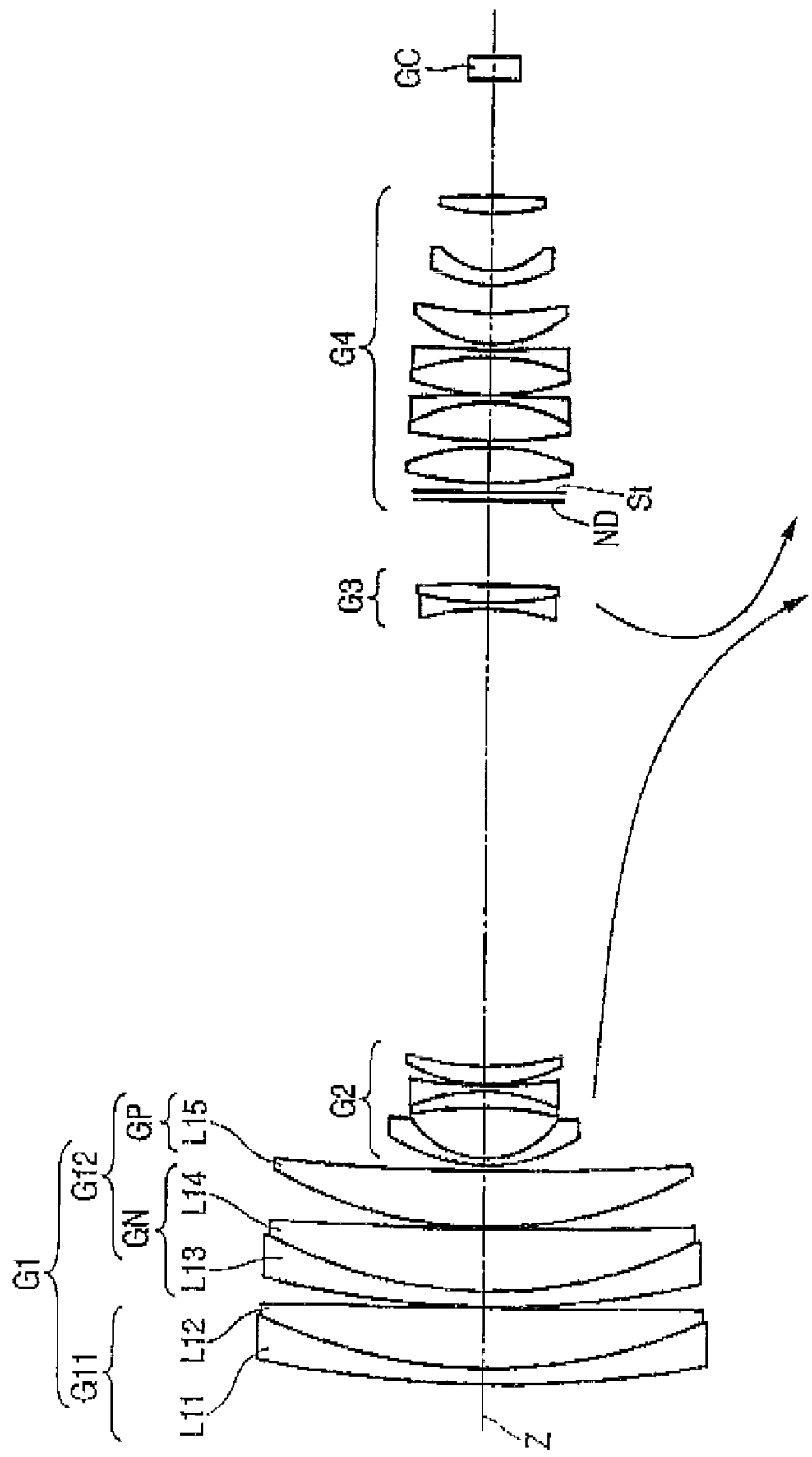
FIG. 1 is a cross-sectional view showing the lens constitution of a zoom lens according to an example 1 of the present invention.

FIGS. 1 to 10 are cross-sectional views showing the constitution of the zoom lens according to the embodiment of the invention, corresponding to the examples 1 to 10 as will be described later. FIGS. 1 to 10 show the lens arrangement at a wide-angle end at the time of in-focus at infinity, in which an object side is the left side of each figure and an image side is the right side. Since all the examples 1 to 10 have the same basic constitution, the constitution of an example 1 as shown in FIG. 1 will be described below as the basis.

This zoom lens is suitably mounted on a high performance television camera or video camera using a solid state image pickup device, and is appropriate in the range from a normal area having a variable power ratio of 20 times or more to a telephoto area, for example.

This zoom lens has a four group constitution, and is composed of a first group G1, a second group G2, a third group G3 and a fourth group G4 which are arranged along an optical axis Z in order from an object side. The first group G1 has a positive refractive power as a whole and functions as a stationary group that is stationary at the time of variable power. The second group G2 is disposed, following the first group G1, on an image side of the first group G1, and functions as a variable power group for making the variable power operation by moving in the optical axis direction at the time of variable power. The third group G3 corrects an image point variation occurring with the variable power by moving in the optical axis direction at the time of variable power. The fourth group G4 is stationary at the time of variable power, has a positive refractive power as a whole, and functions as a relay group having an image formation operation.

The second group G2 and the third group G3 function together as a zoom part. In FIGS. 1 to 10, the movement locus of each lens group at the time of variable power leading from the wide-angle end to the telescopic end is typically shown by the arrow under the second group G2 and the third group G3. This zoom lens takes a so-called inner zoom lens method for making the variable power by moving the group inside an optical system, but not the top end of the optical system. In the television camera or video camera, such inner zoom method is preferable because it has excellent operability and there is smaller variation in the total length and weight balance at the time of variable power.

In an example of FIG. 1, the first group G1 is composed of five lenses, the second group G2 is composed of four lenses, the third group G3 is composed of two lenses, and the fourth group G4 is composed of eight lenses. The number of lenses in each group of the zoom lens of the invention is not limited to the example as shown in FIG. 1.

On the closest object side of the fourth group G4, an ND (neutral density) filter ND and an aperture diaphragm St are disposed. The ND filter ND is configured to have a density distribution from a point on the optical axis in the radial direction to reduce a change in the illumination intensity on an image surface caused by the variable power. This ND filter is not necessarily an essential component for the zoom lens of the invention, but may be dispensed with in this invention. Also, the aperture diaphragm St as shown in FIGS. 1 to 10 indicates the position on the optical axis Z, but does not necessarily represent the shape or size. In the zoom lens of the invention, the position where the aperture diaphragm St is disposed is not limited to the constitutional examples as shown in FIGS. 1 to 10.

On the image side of the fourth group G4, a cover glass GC for the solid state image pickup device is disposed. A surface of the cover glass GC on the image side corresponds to an image pickup surface of the solid state image pickup device. This cover glass is disposed so that this surface may coincide with the image surface of this zoom lens. The cover glass GC may have a function of an infrared cut filter or a low pass filter. An optical system for color separation composed of a color separation prism may be disposed between the fourth group G4 and the image surface.

The zoom lens with the above constitution achieves the variable power by scaling the focal length of the first group G1 of the stationary group with the second group G2 of the variable power group. Accordingly, the first group G1 has a great influence on the aberration of the entire zoom lens or an aberration variation caused by the variable power or the focal length variation, and has a more remarkable influence on the telescopic end, especially at the higher power. To keep the high optical performance by suppressing the residual secondary spectrum over the total variable power range, it is required that the chromatic aberration is excellently corrected by only the first group G1 of the stationary group.

The first group G1 has a first lens group G11 and a second lens group G12, both having a positive refractive power, which are arranged in order from the object side. The first lens group G11 is composed of a negative meniscus lens and a positive lens in order from the object side, and the second lens group G12 comprises a negative lens group ON composed of a negative meniscus lens and a positive lens and having a negative refractive power as a whole and a positive lens group GP composed of at least one positive lens and having a positive refractive power as a whole in order from the object side.

The detailed constitution of the first group G1 in each of the constitutional examples as shown in FIGS. 1 to 10 is as follows. The same constitution is collectively described.

Figure 6:
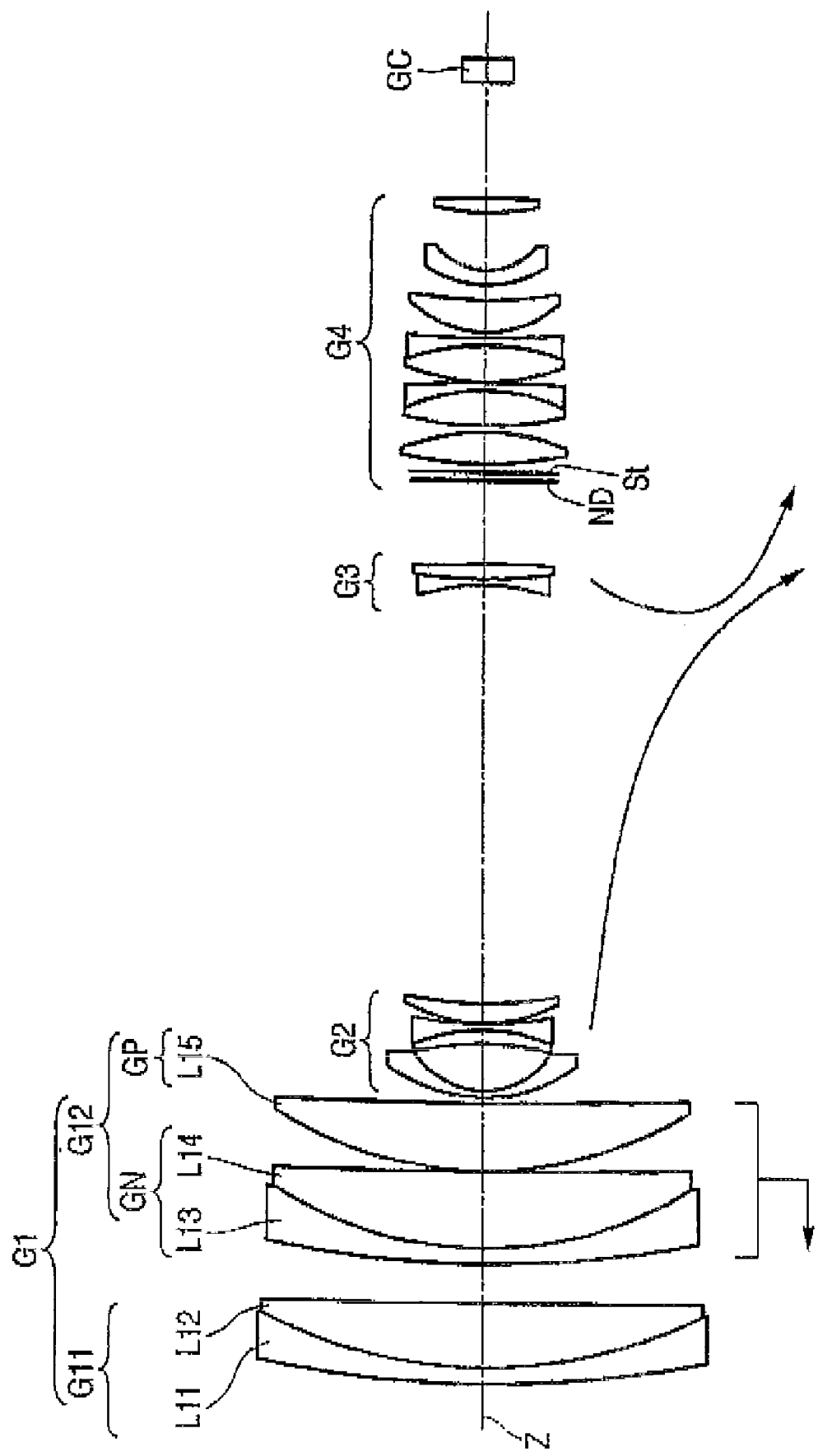
FIG. 6 is a cross-sectional view showing the lens constitution of a zoom lens according to an example 6 of the invention.

In the constitutional example as shown in FIGS. 1 and 6, in order from the object side, the first lens group G11 is a compound lens composed of a negative lens L11 and a positive lens L12, the negative lens group GN is a compound lens composed of a negative lens L13 and a positive lens L14, and the positive lens group GP is composed of one positive lens L15, in which all the lenses constituting the first group have the meniscus shape in which the convex surface is directed to the object side.

Figure 2:
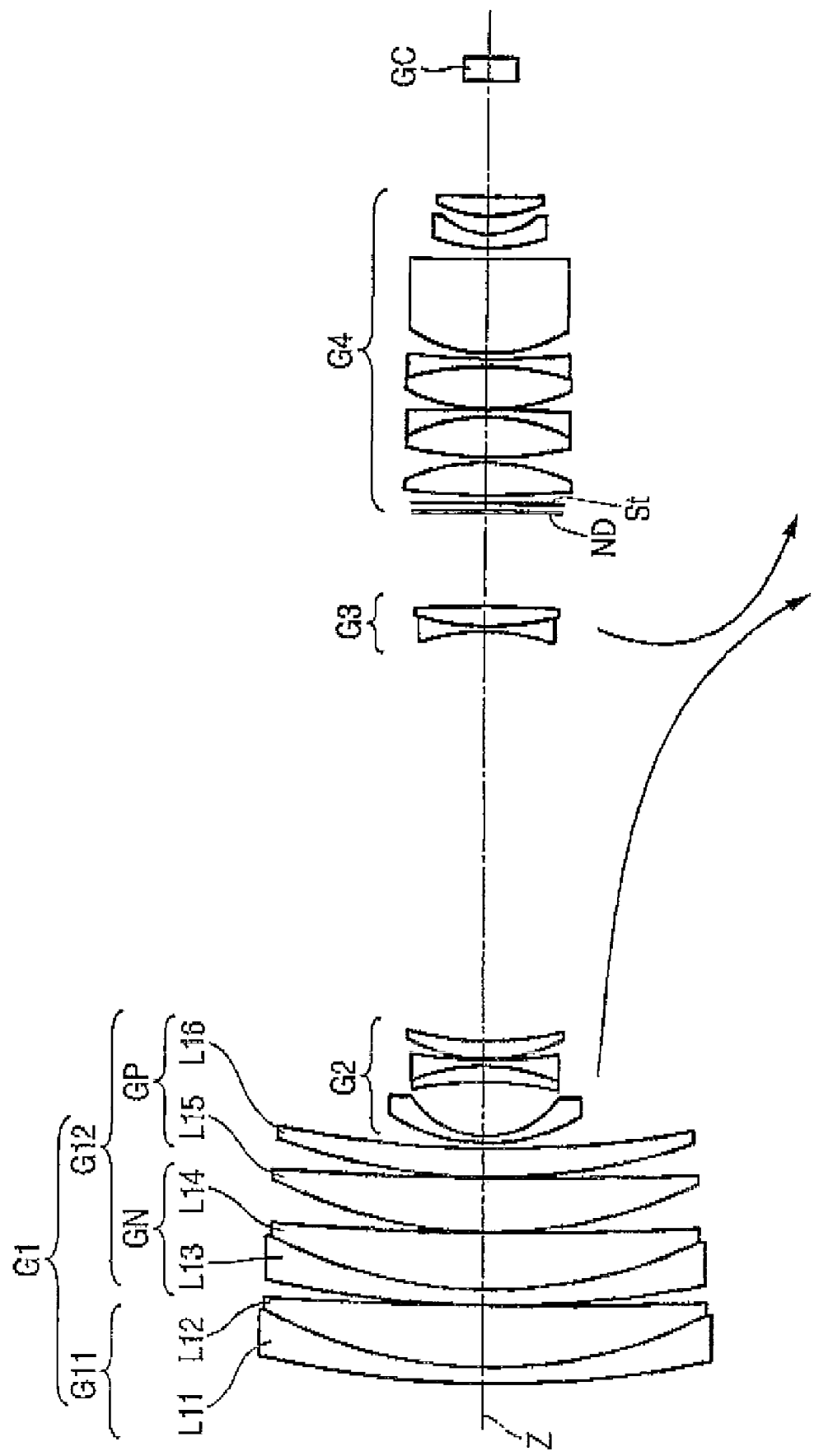
FIG. 2 is a cross-sectional view showing the lens constitution of a zoom lens according to an example 2 of the invention.
Figure 10:
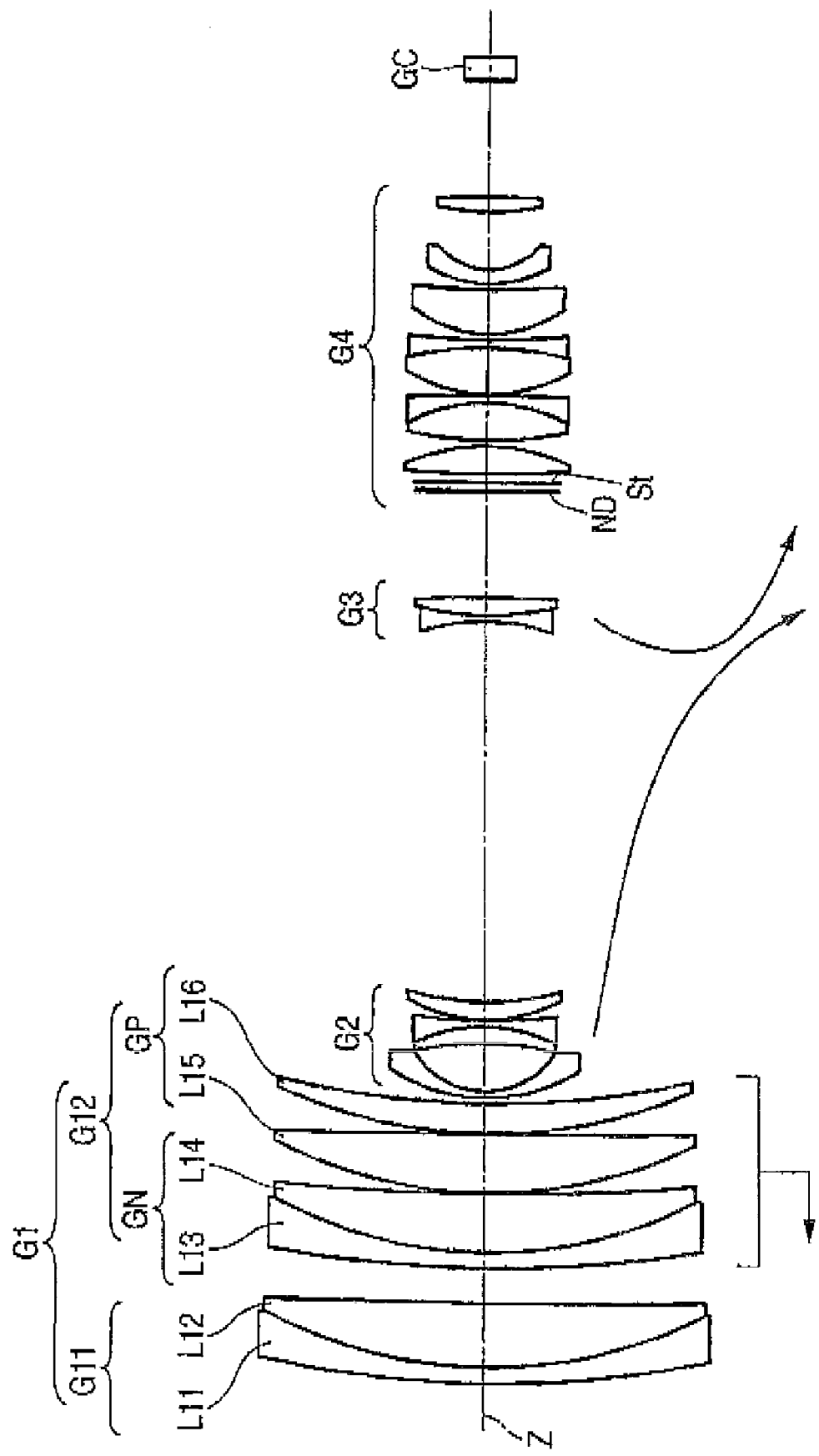
FIG. 10 is a cross-sectional view showing the lens constitution of a zoom lens according to an example 10 of the invention.
Figure 11:
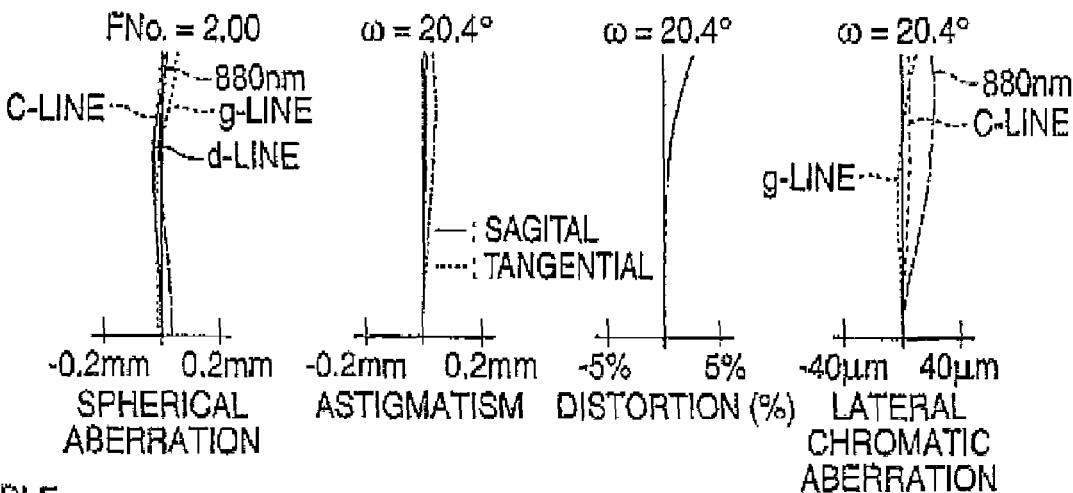
FIG. 11 is an aberration view of the zoom lens according to the example 1 of the invention.
Figure 11:
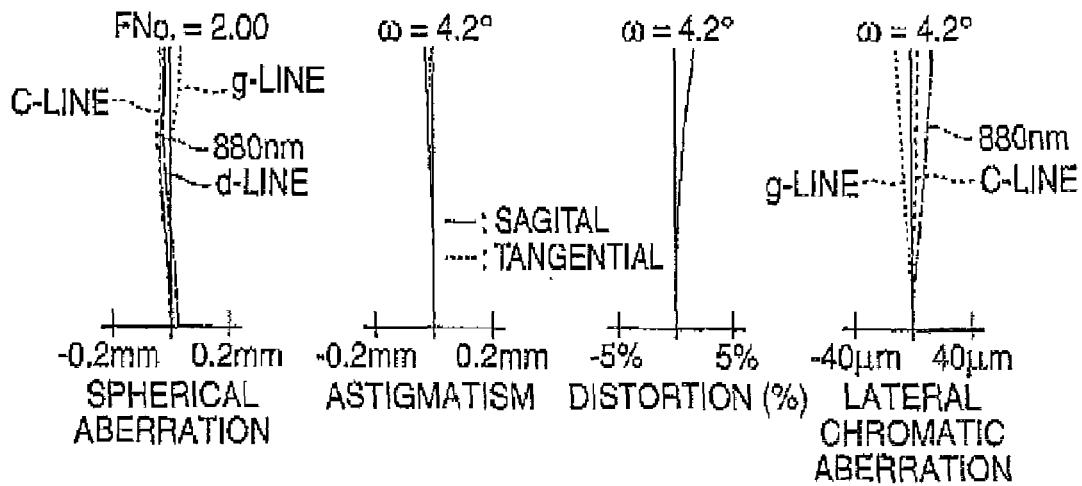
Figure 11:
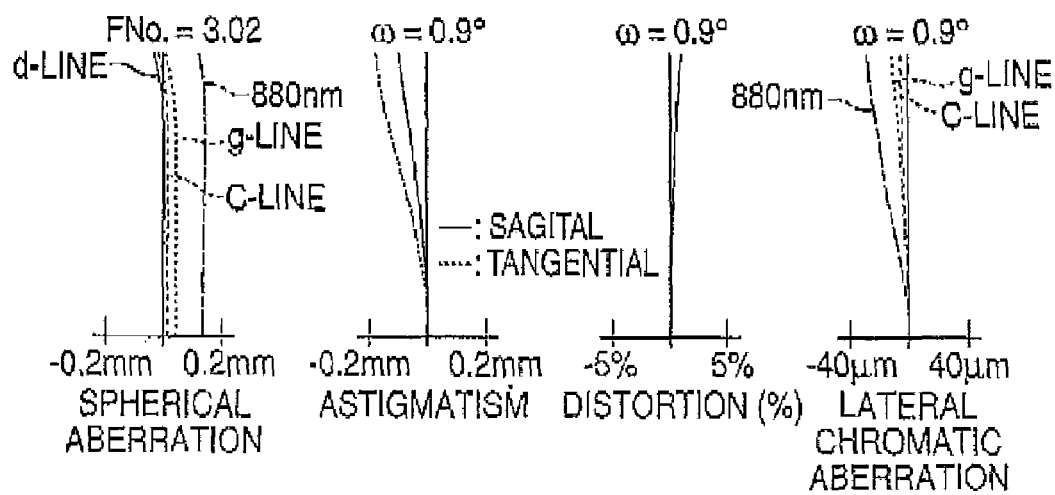
Figure 12:
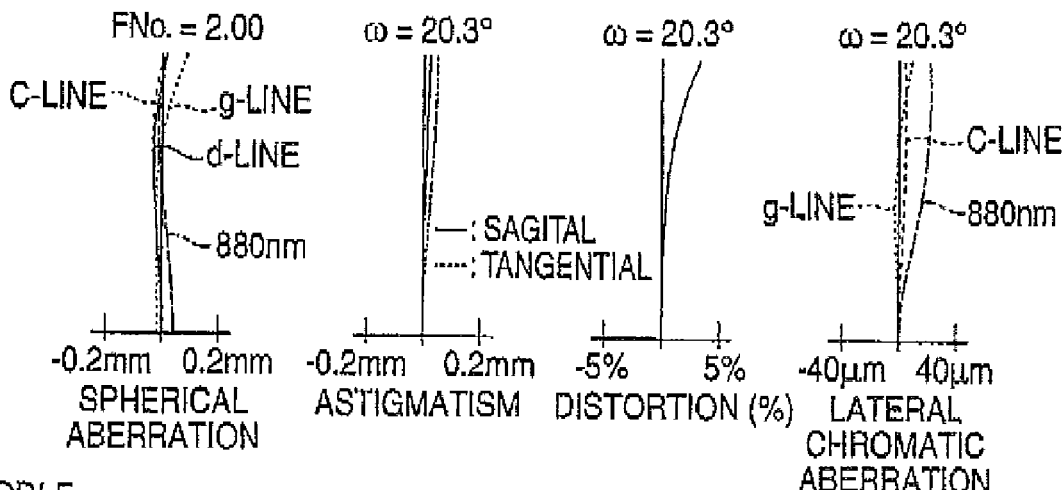
FIG. 12 is an aberration view of the zoom lens according to the example 2 of the invention.
Figure 12:
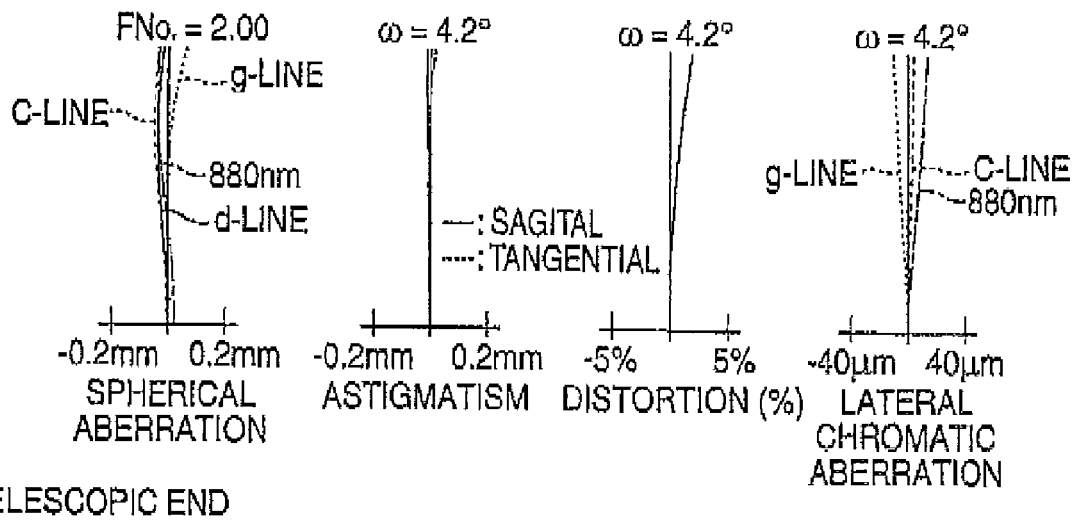
Figure 12:
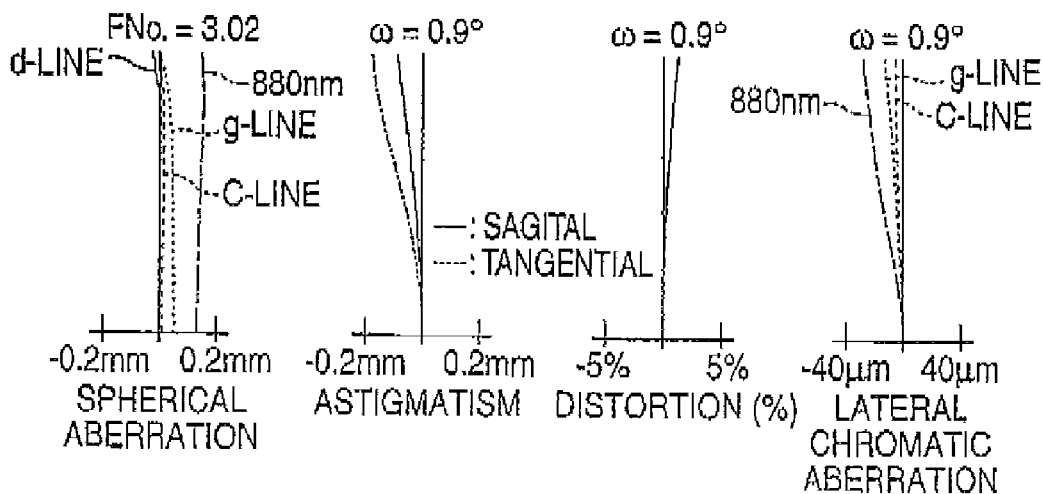
Figure 13:
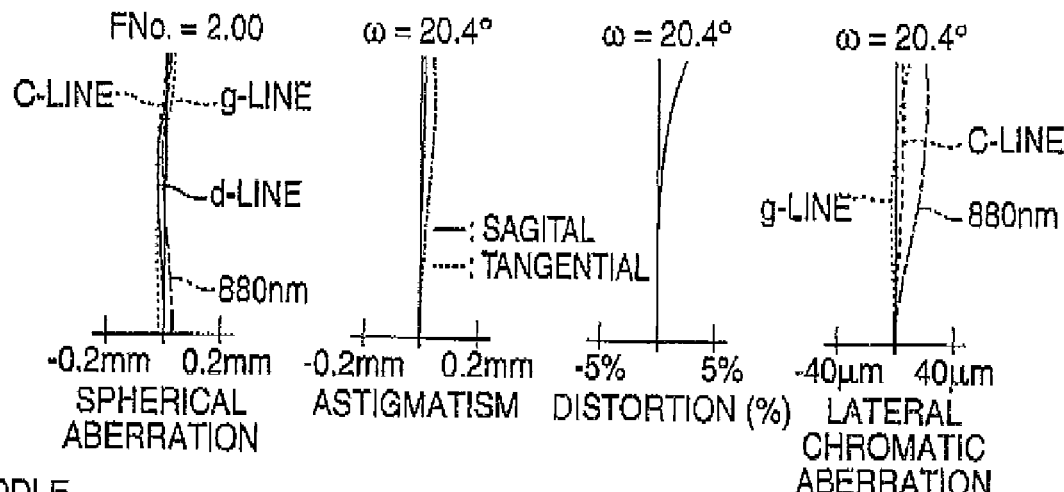
FIG. 13 is an aberration view of the zoom lens according to the example 3 of the invention.
Figure 13:
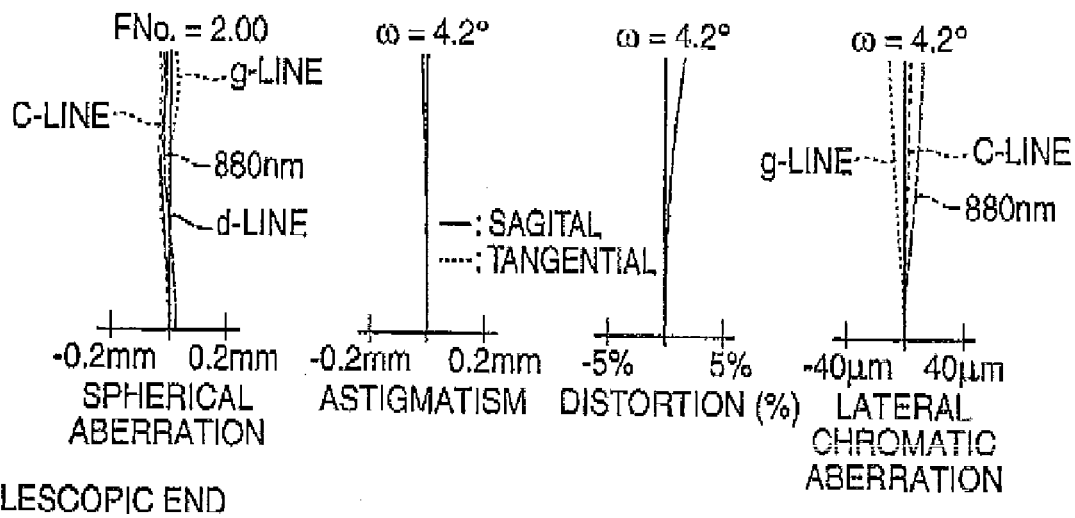
Figure 13:
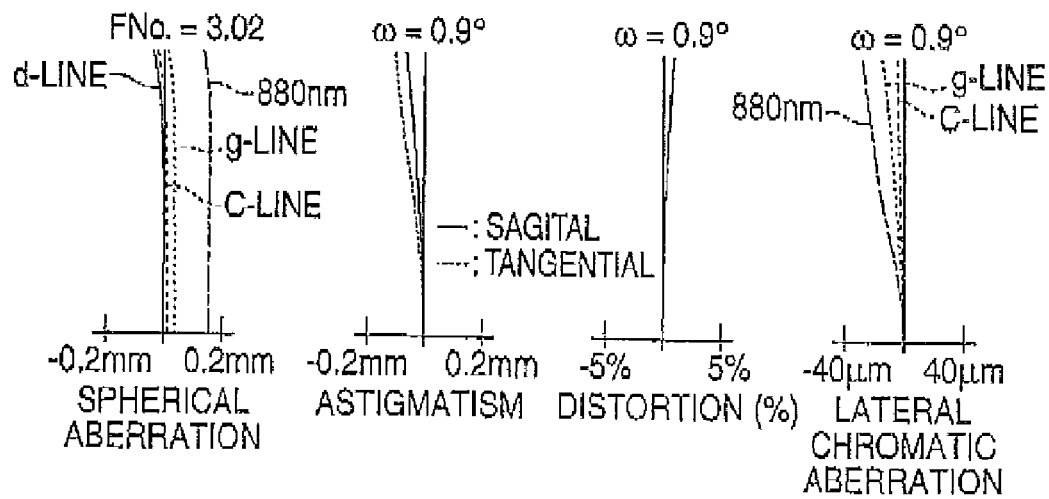
Figure 14:
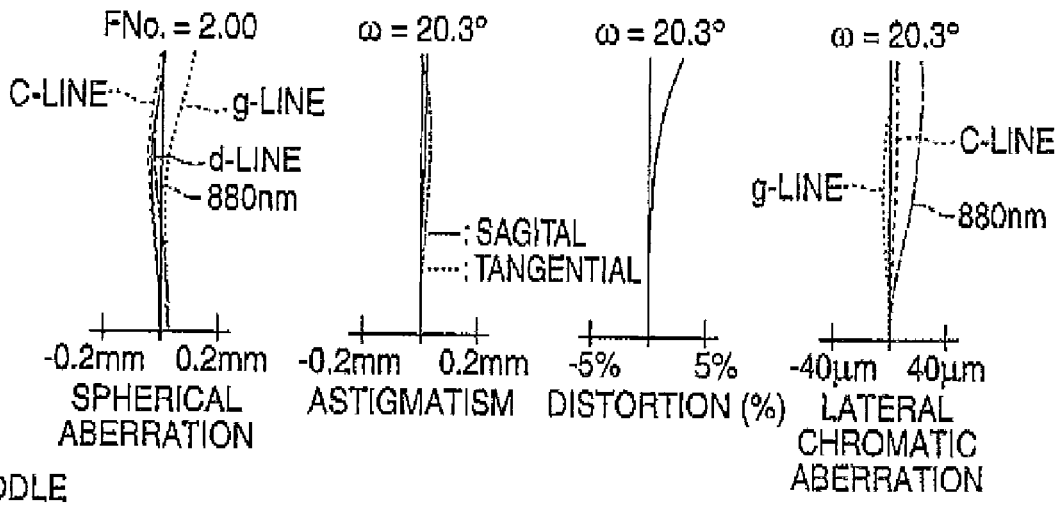
FIG. 14 is an aberration view of the zoom lens according to the example 4 of the invention.
Figure 14:
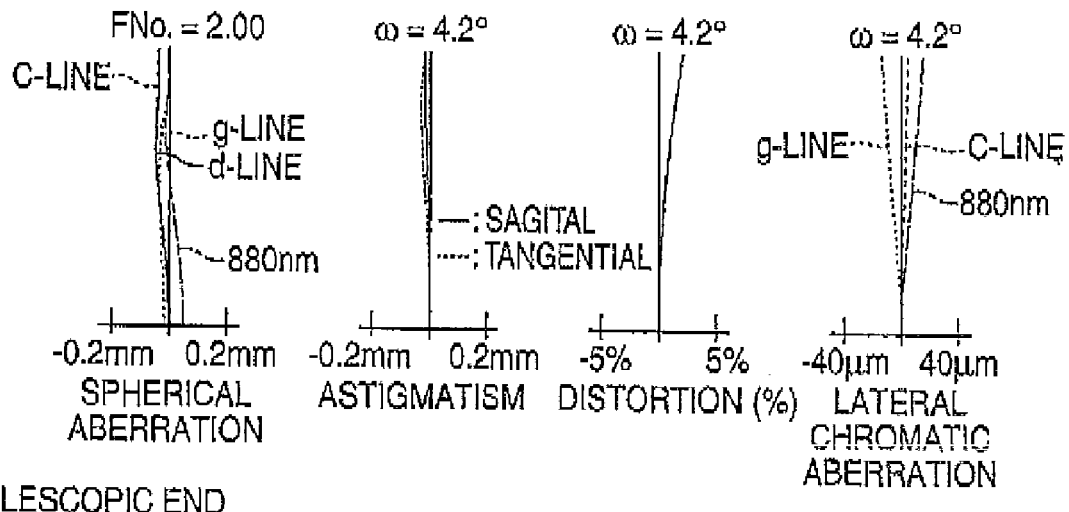
Figure 14:
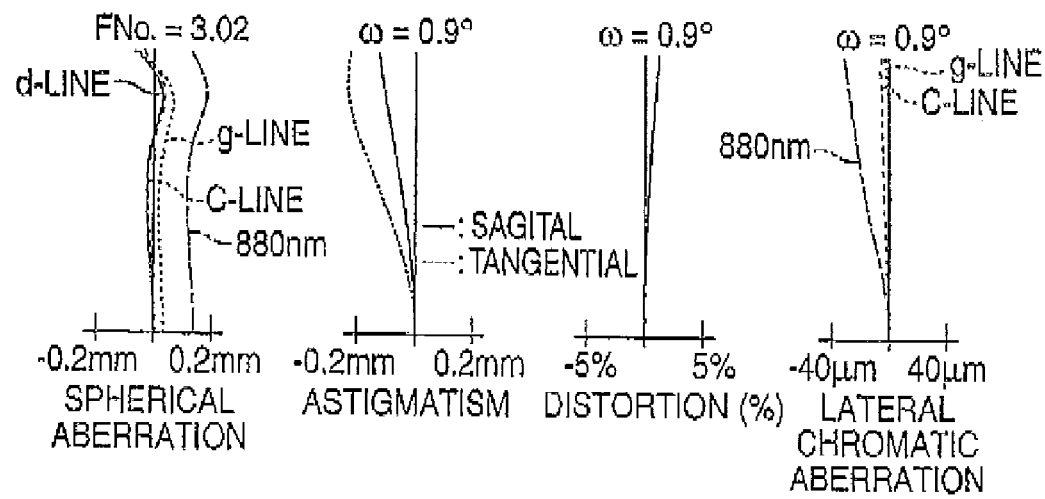
Figure 15:
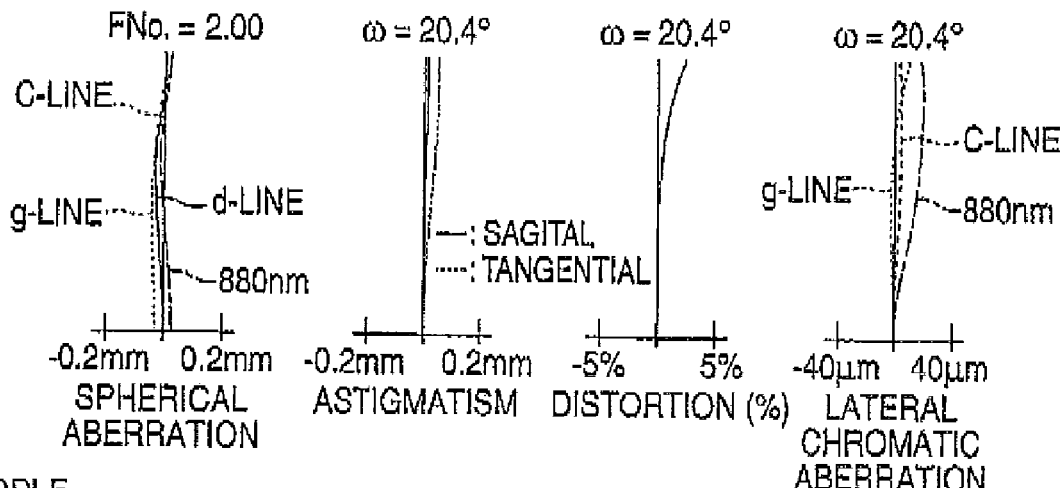
FIG. 15 is an aberration view of the zoom lens according to the example 5 of the invention.
Figure 15:
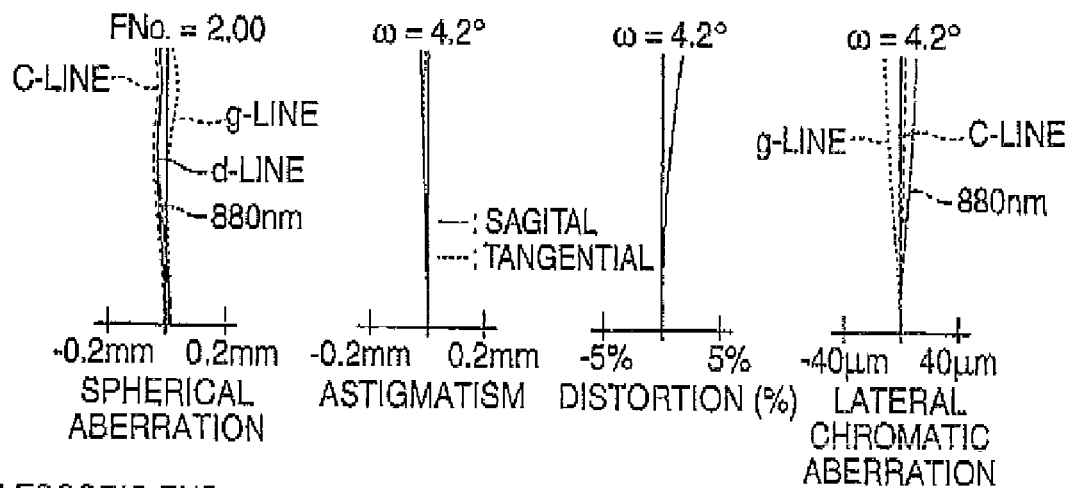
Figure 15:
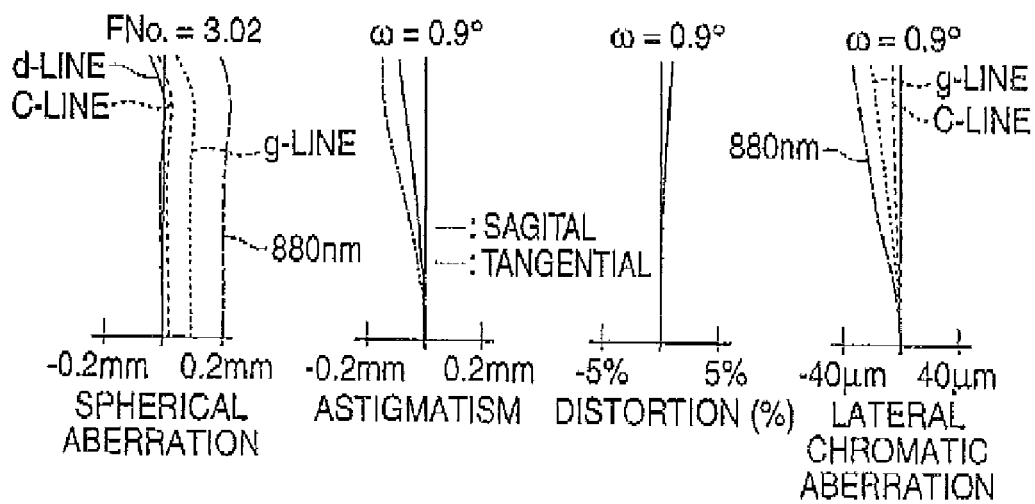
Figure 16:
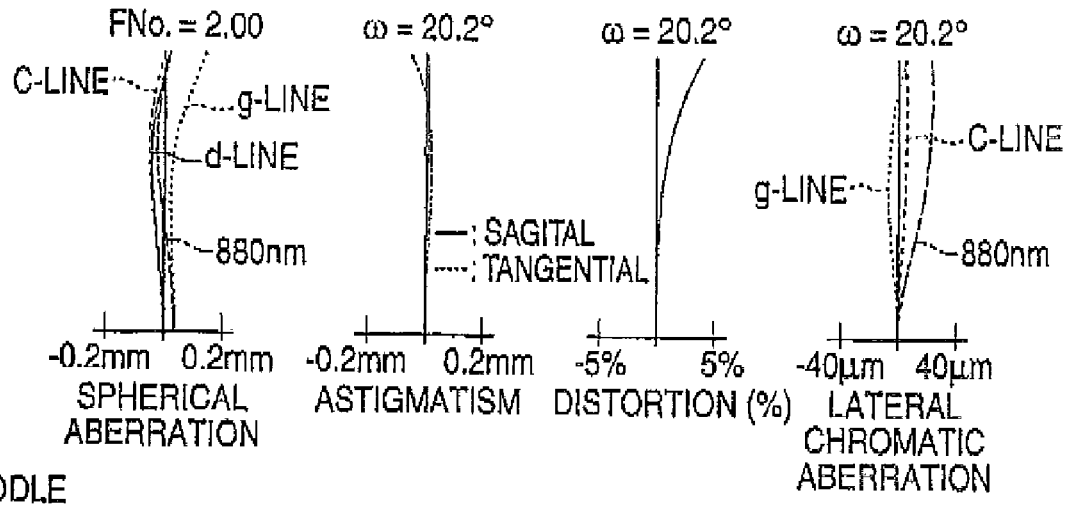
FIG. 16 is an aberration view of the zoom lens according to the example 6 of the invention.
Figure 16:
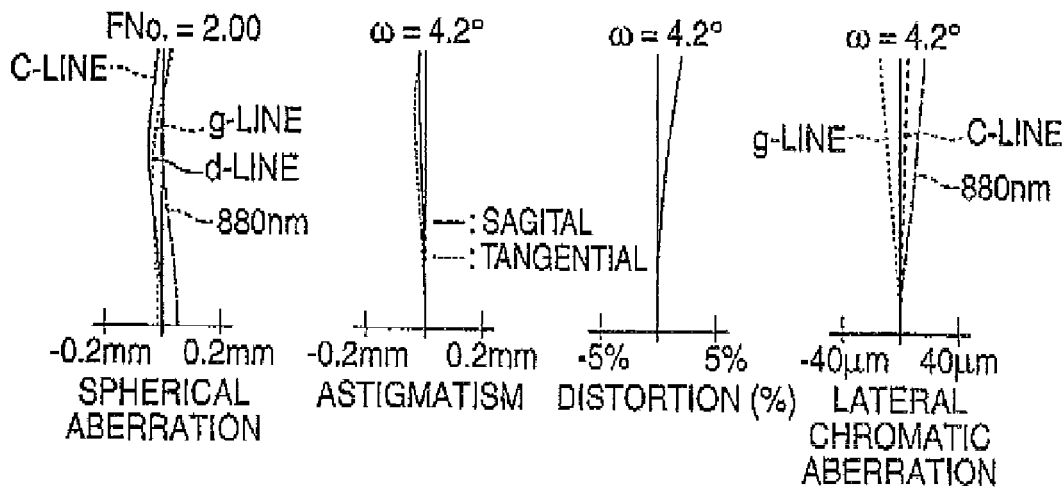
Figure 16:
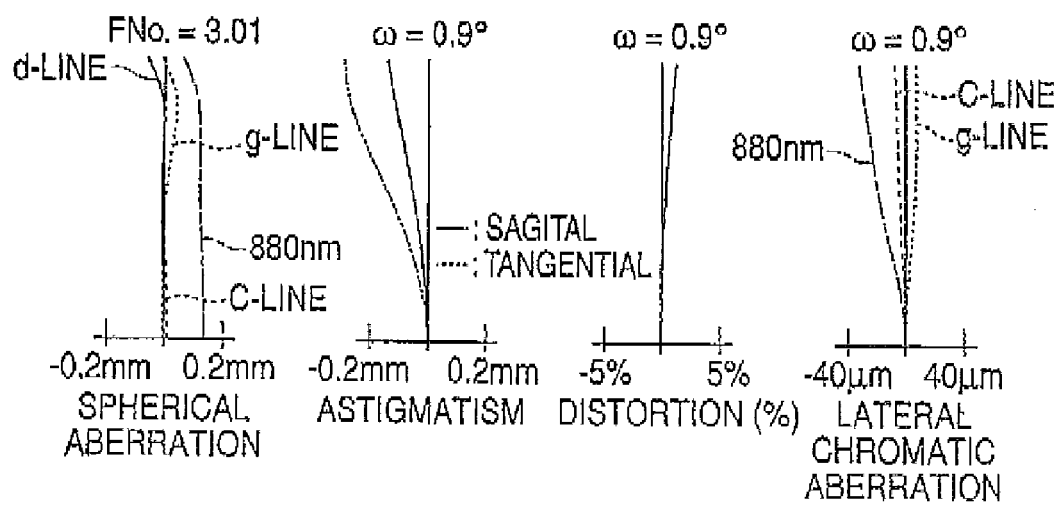
Figure 17:
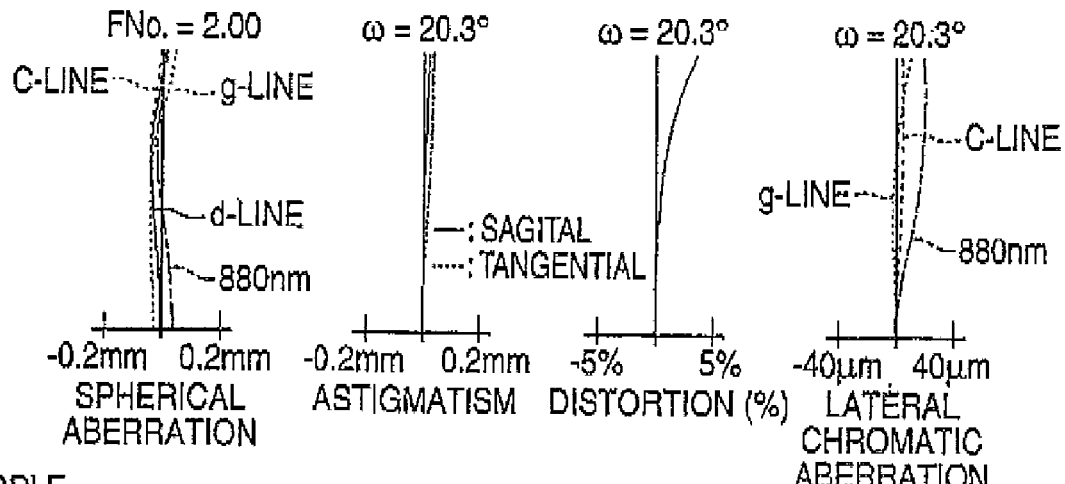
FIG. 17 is an aberration view of the zoom lens according to the example 7 of the invention.
Figure 17:
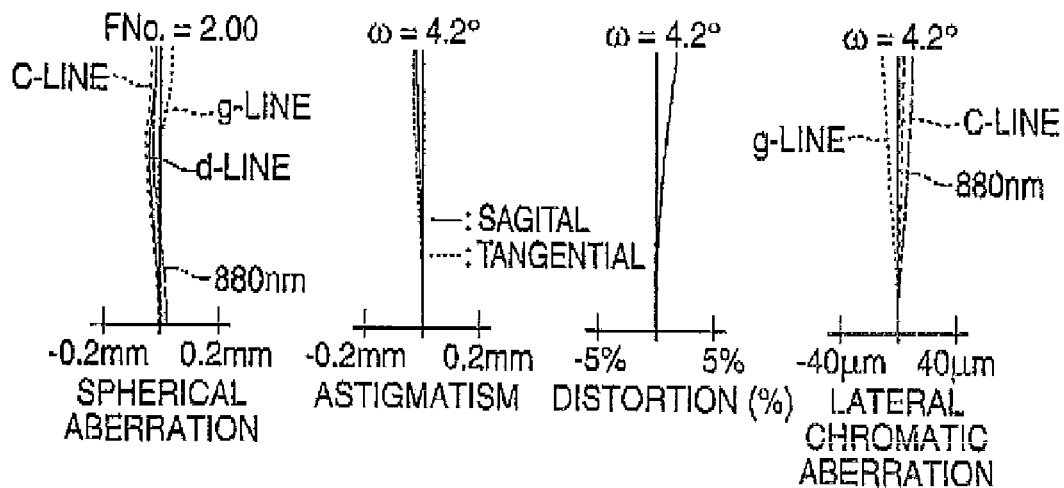
Figure 17:
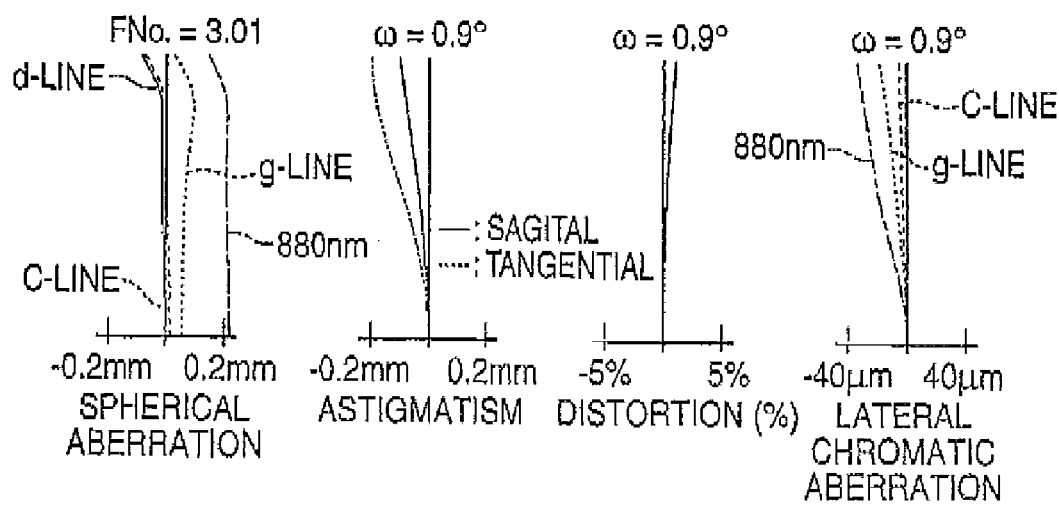
Figure 18:
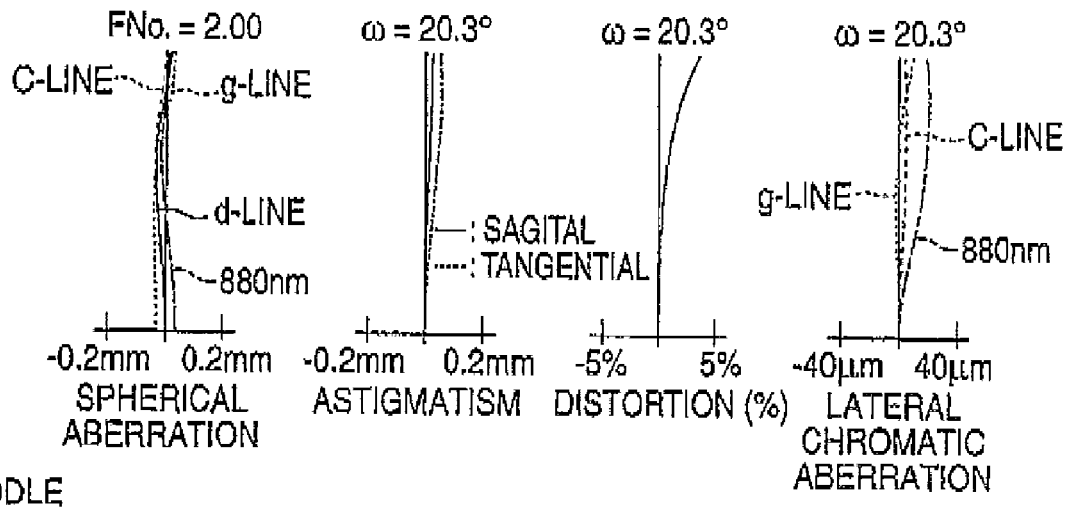
FIG. 18 is an aberration view of the zoom lens according to the example 8 of the invention.
Figure 18:
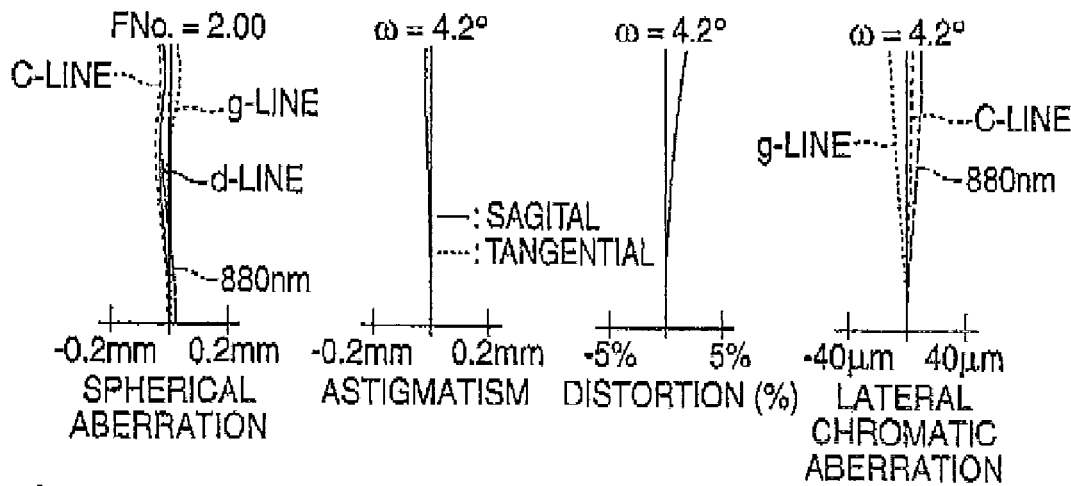
Figure 18:
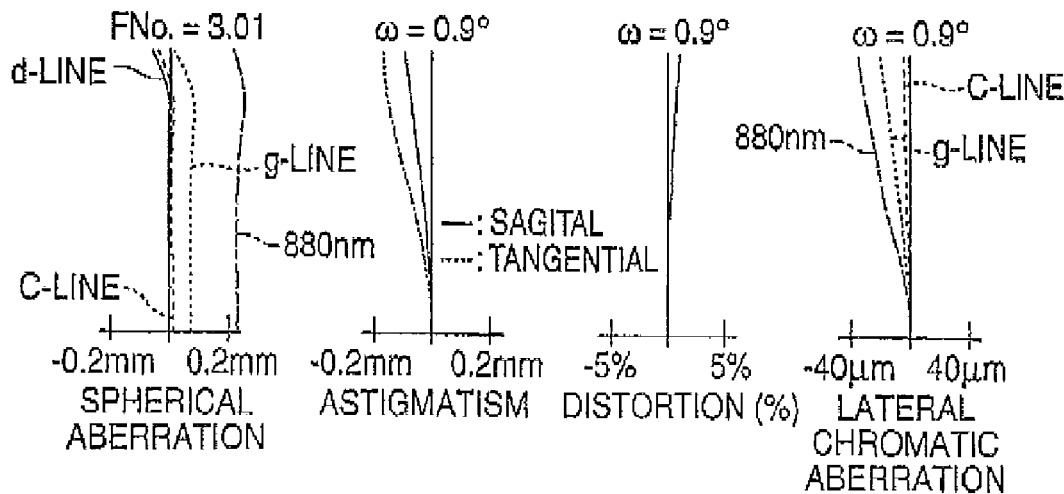
Figure 19:
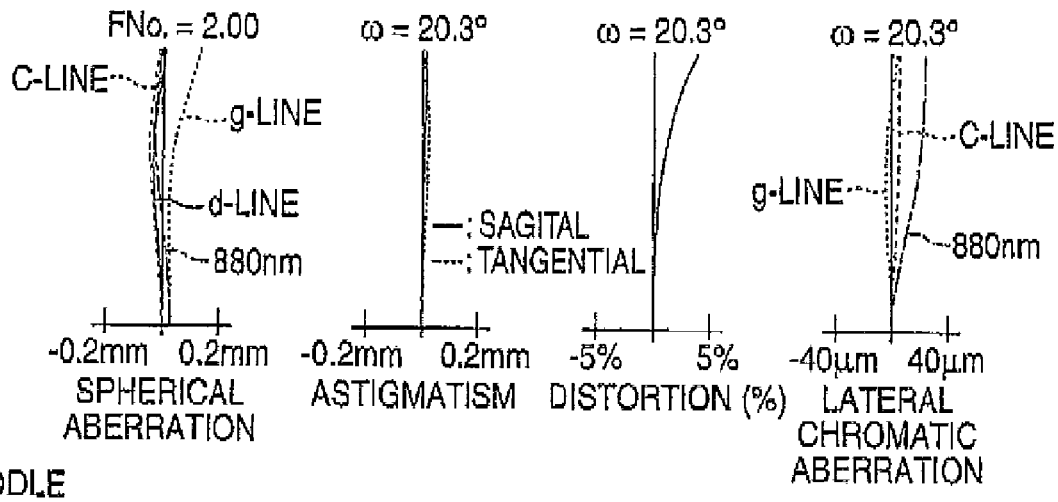
FIG. 19 is an aberration view of the zoom lens according to the example 9 of the invention.
Figure 19:
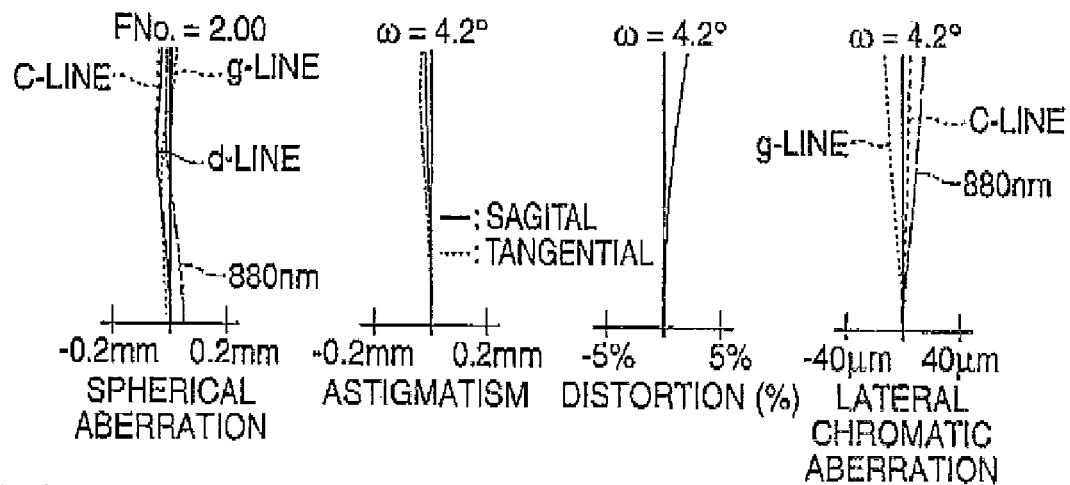
Figure 19:
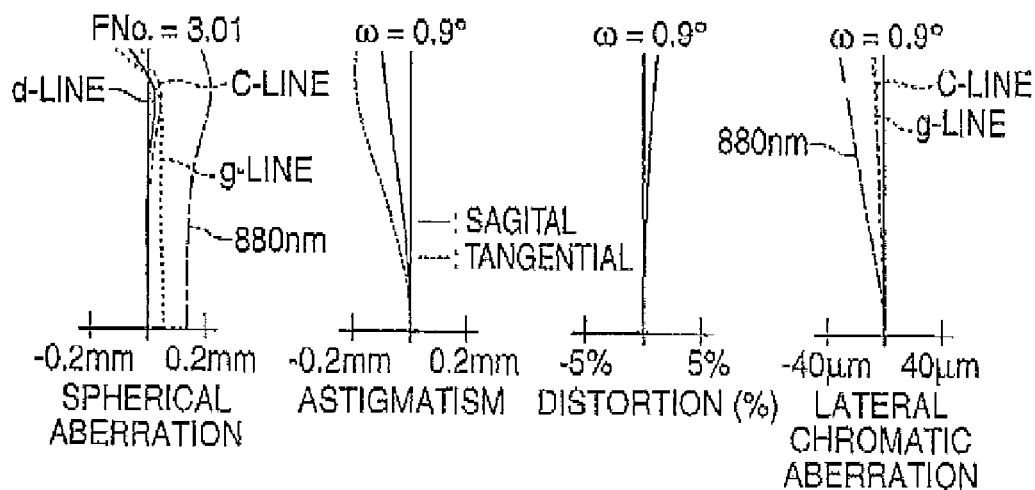
Figure 20:
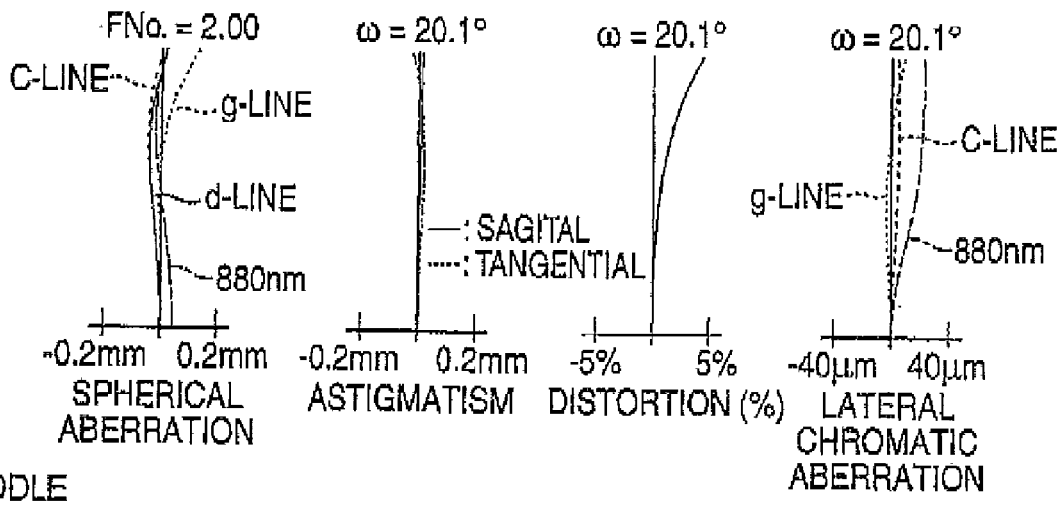
FIG. 20 is an aberration view of the zoom lens according to the example 10 of the invention.
Figure 20:
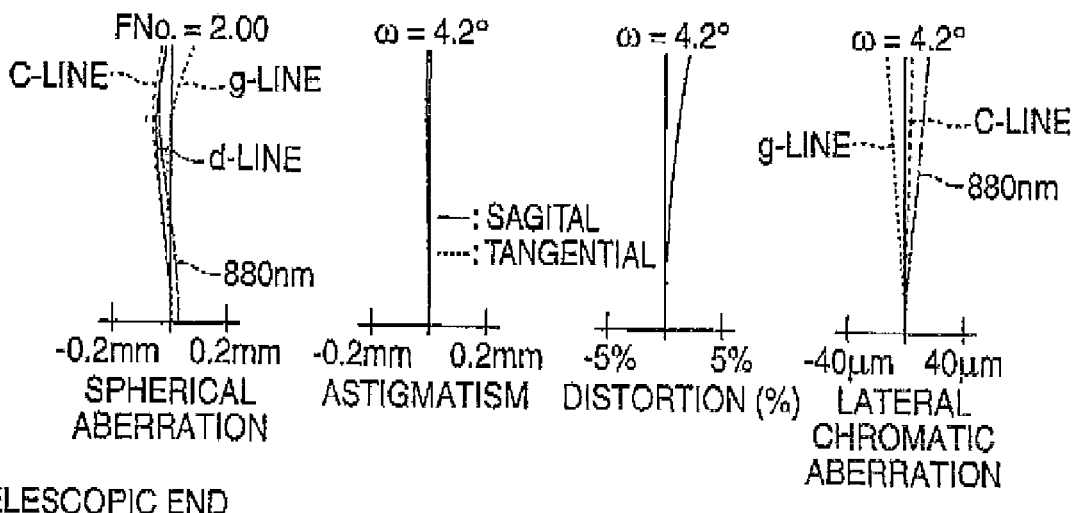
Figure 20:
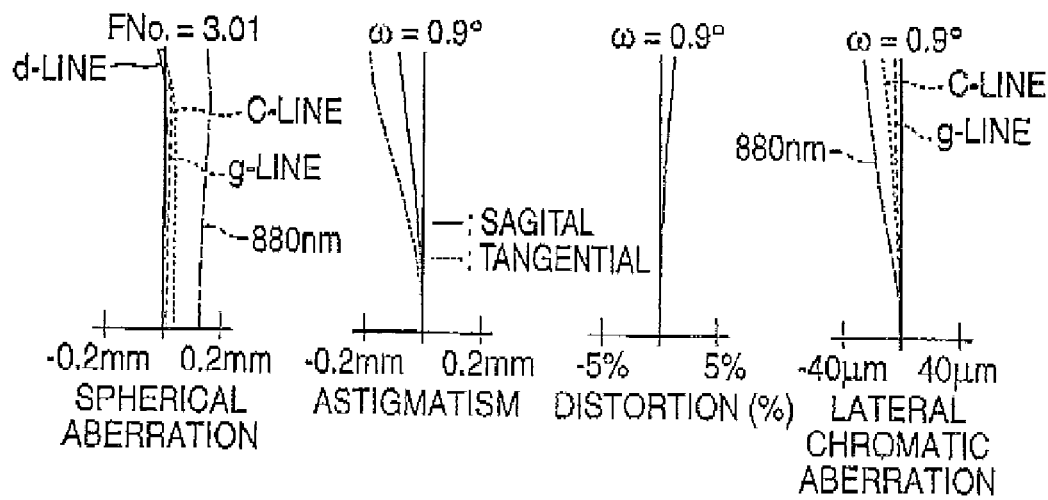

In the constitutional example as shown in FIGS. 2 and 10, in order from the object side, the first lens group G11 is a compound lens composed of a negative lens L11 and a positive lens L12, the negative lens group GN is a compound lens composed of a negative lens L13 and a positive lens L14, and the positive lens group GP is composed of two positive lenses L15 and L16, in which all the lenses constituting the first group have the meniscus shape in which the convex surface is directed to the object side.

Figure 3:
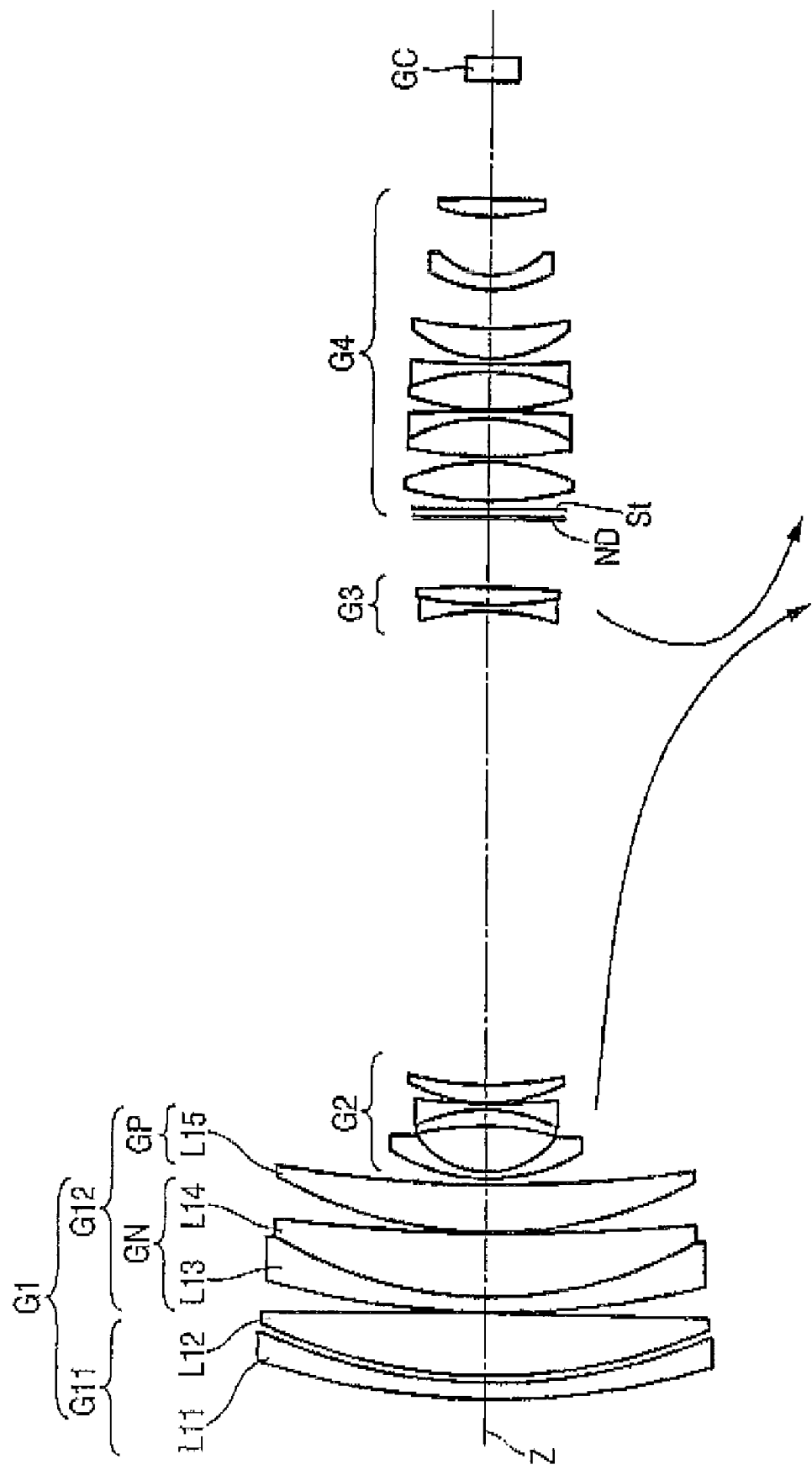
FIG. 3 is a cross-sectional view showing the lens constitution of a zoom lens according to an example 3 of the present invention.

In the constitutional example as shown in FIG. 3, in order from the object side, the first lens group G11 is composed of a negative lens L11 and a positive lens L12, the negative lens group GN is a compound lens composed of a negative lens L13 and a positive lens L14, and the positive lens group GP is composed of one positive lens L15, in which all the lenses constituting the first group, except for the biconvex positive lens L12, have the meniscus shape in which the convex surface is directed to the object side.

Figure 4:
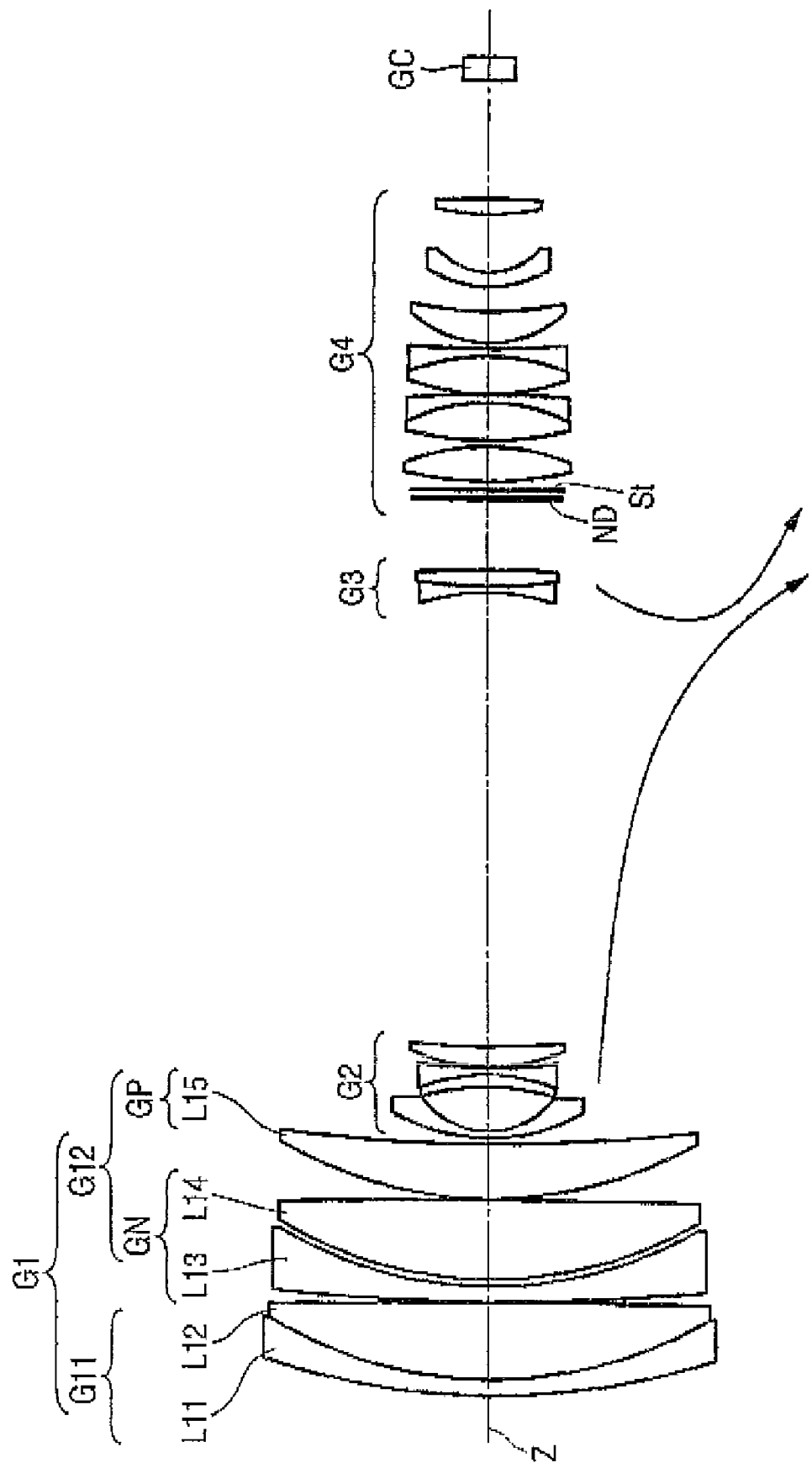
FIG. 4 is a cross-sectional view showing the lens constitution of a zoom lens according to an example 4 of the invention.

In the constitutional example as shown in FIG. 4, in order from the object side, the first lens group G11 is a compound lens composed of a negative lens L11 and a positive lens L12, the negative lens group GN is composed of a negative lens L13 and a positive lens L14, and the positive lens group GP is composed of one positive lens L15, in which all the lenses constituting the first group, except for the biconvex positive lenses L12 and L14, have the meniscus shape in which the convex surface is directed to the object side.

Figure 5:
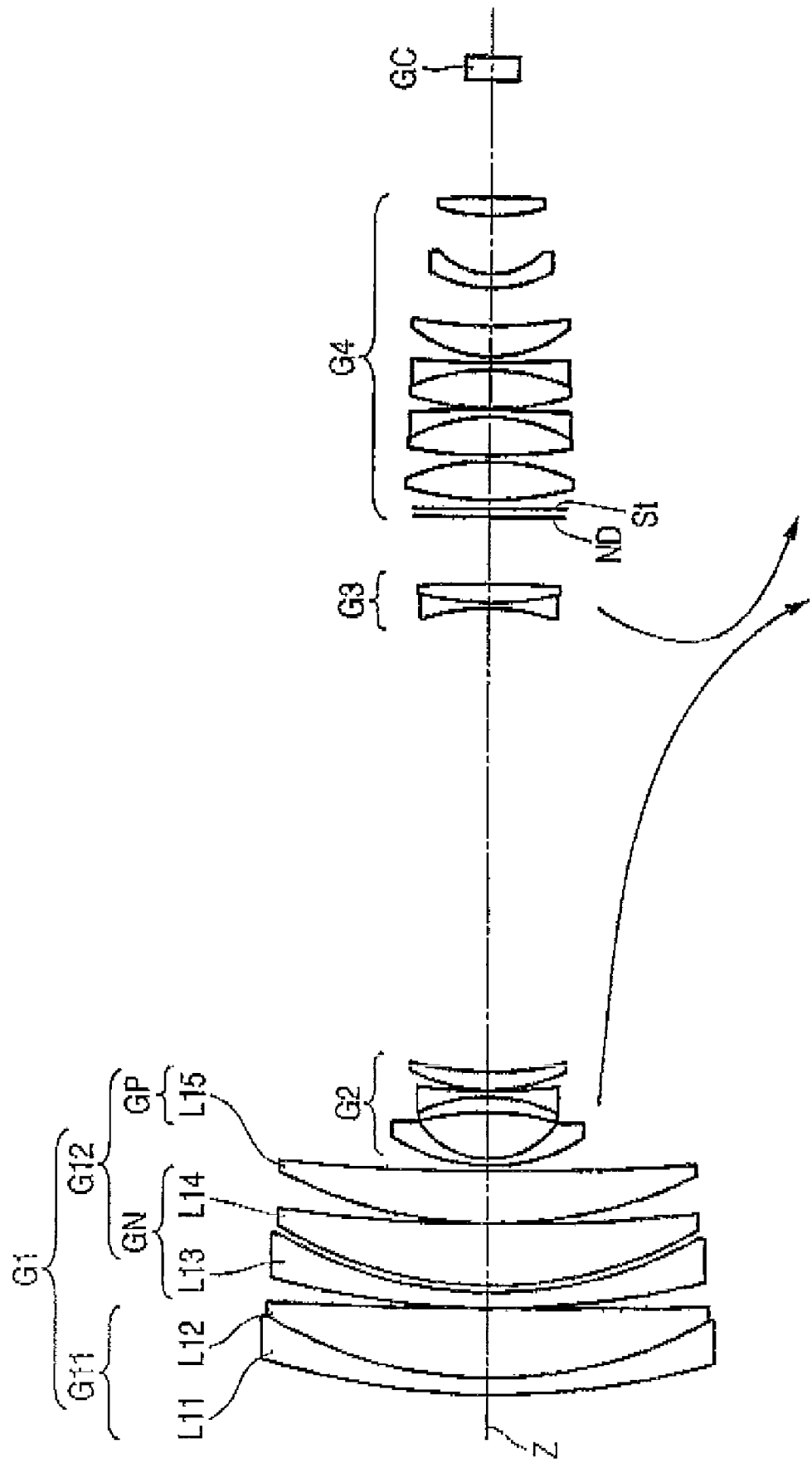
FIG. 5 is a cross-sectional view showing the lens constitution of a zoom lens according to an example 5 of the present invention.

In the constitutional example as shown in FIG. 5, in order from the object side, the first lens group G11 is a compound lens composed of a negative lens L11 and a positive lens L12, the negative lens group GN is composed of a negative lens L13 and a positive lens L14, and the positive lens group GP is composed of one positive lens L15, in which all the lenses constituting the first group have the meniscus shape in which the convex surface is directed to the object side.

Figure 7:
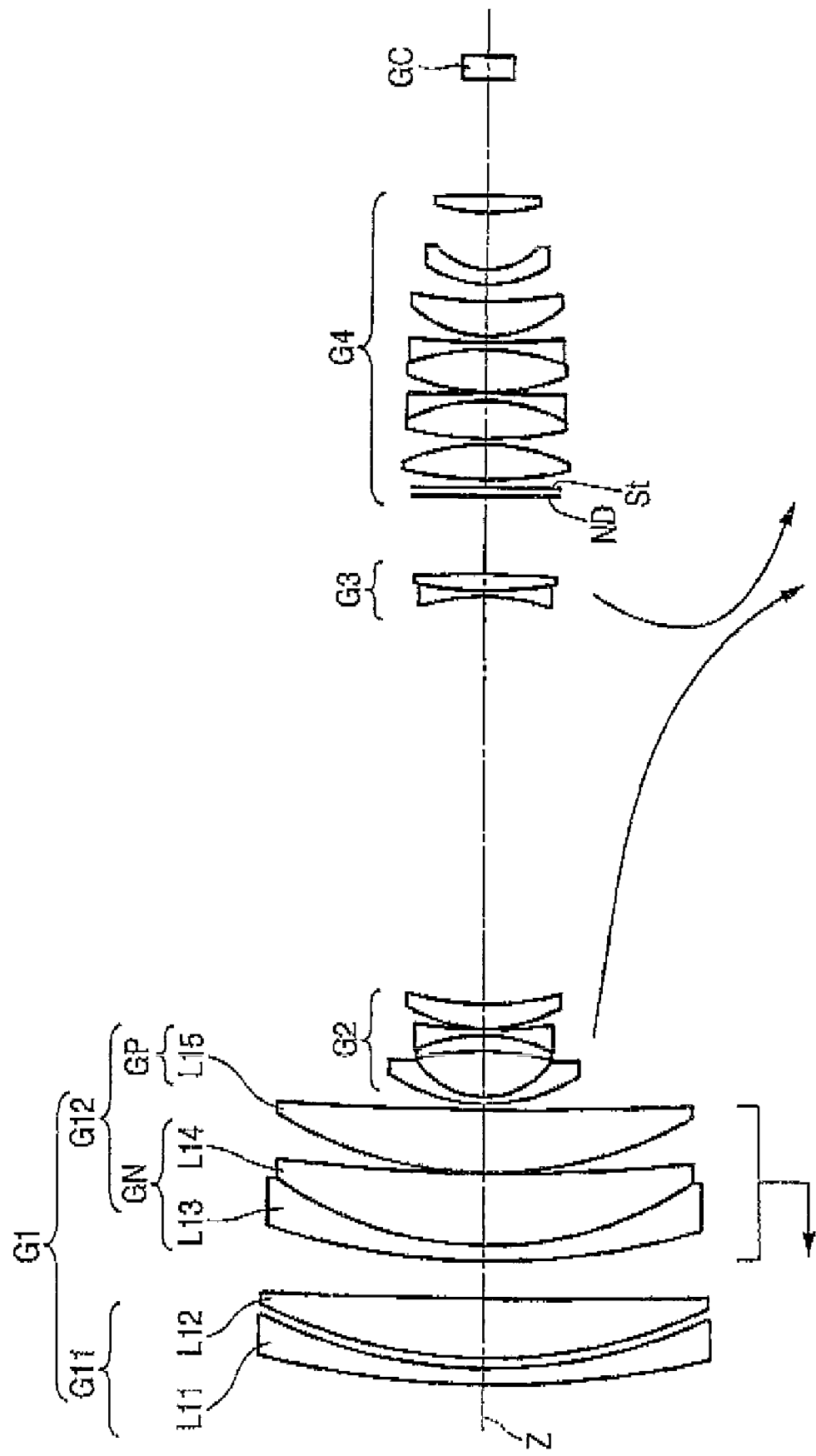
FIG. 7 is a cross-sectional view showing the lens constitution of a zoom lens according to an example 7 of the present invention.
Figure 8:
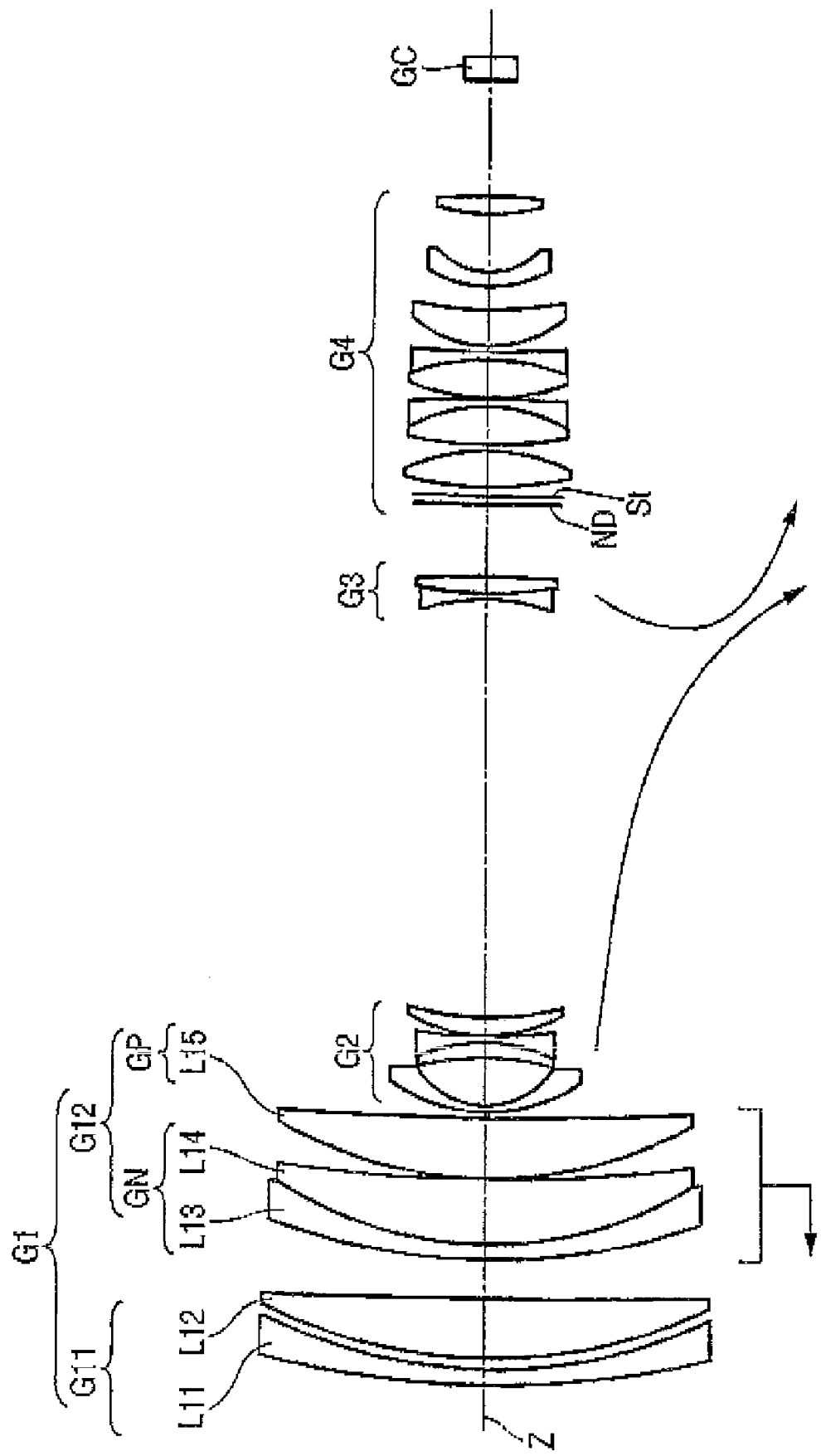
FIG. 8 is a cross-sectional view showing the lens constitution of a zoom lens according to an example 8 of the invention.

In the constitutional examples as shown in FIGS. 7 and 8, in order from the object side, the first lens group G11 is composed of a negative lens L11 and a positive lens L12, the negative lens group GN is a compound lens composed of a negative lens L13 and a positive lens L14, and the positive lens group GP is composed of one positive lens L15, in which all the lenses constituting the first group have the meniscus shape in which the convex surface is directed to the object side.

Figure 9:
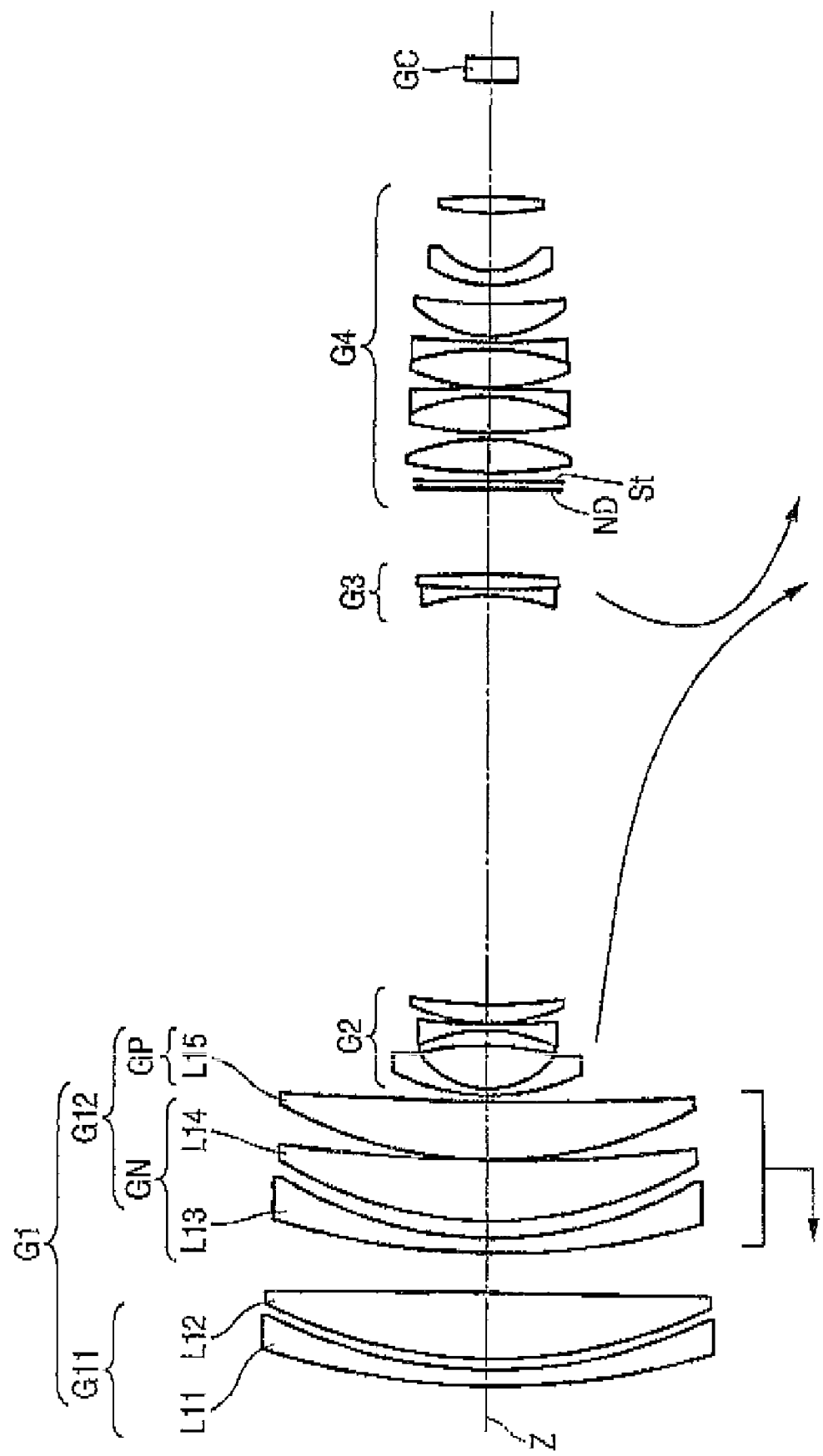
FIG. 9 is a cross-sectional view showing the lens constitution of a zoom lens according to an example 9 of the present invention.

In the constitutional example as shown in FIG. 9, in order from the object side, the first lens group G11 is composed of a negative lens L11 and a positive lens L12, the negative lens group GN is composed of a negative lens L13 and a positive lens L14, and the positive lens group GP is composed of one positive lens L15, in which all the lenses constituting the first group, except for the biconvex positive lens L12, have the meniscus shape in which the convex surface is directed to the object side.

As described above, each zoom lens as shown in FIGS. 1 to 10 has such a power allocation that the first lens group G11, the negative lens group GN and the positive lens group GP constituting the first group G1 have positive, negative and positive power. Since the first group G1 has a positive refractive power as a whole, it is conceived that the power of each group constituting the first group G1 may be positive, positive and positive. In this case, however, the refractive power of each lens can not be made too great to excellently correct the aberration at the reference wavelength, so that the effect of correcting the chromatic aberration can not be obtained sufficiently. Or it is required to increase the degree of freedom in the design by increasing the number of lenses to compensate each lens while keeping the refractive power of each lens small, but the optical system has a larger size.

On the contrary, the zoom lens of this embodiment has such a power allocation that the groups within the first group G1 have positive, negative and positive power, whereby the refractive power of each of the positive and negative lenses can be greater than the case where all the groups of the first group G1 have the positive refractive power, so that the degree of freedom for allocating the refractive power of each lens suitably can be increased.

Also, in this zoom lens, both the first lens group G11 and the second lens group G12 have a combination of the negative meniscus lens and the positive lens with the high effect of correcting the chromatic aberration, and the lens groups are arranged in the order of negative, positive, negative and positive from the object side as described above, whereby the chromatic aberration can be excellently corrected with the power allocation, and various kinds of aberration can be excellently corrected. And since the positive lens group GP of the first group G1 has at least one positive lens, the positive refractive power can be dispersed at an appropriate allocation, whereby the image surface characteristic is easily improved.

Accordingly, with this zoom lens, the longitudinal chromatic aberration containing the residual secondary spectrum that is the concern in realizing the small sized, zoom lens, and the aberration at the reference wavelength can be corrected in well-balanced manner, so that the high optical performance can be obtained.

The negative meniscus lens and the positive lens which are adjacent in each group do not necessarily take the constitution of the compound lens, but may adopt the constitution of an air lens as in the constitutional examples shown in FIGS. 3, 4, 5, 7, 8 and 9. The air lens has the constitution in which two lenses having adjacent surfaces with near radius of curvature are not cemented together, but arranged with a slight air gap. The air lens has a greater degree of freedom in the design and is easier to correct the comatic aberration or the like than the compound lens, and is favorable for making the aberration correction.

For the zoom lens according to this embodiment, it is preferable that an average value vn of Abbe numbers to the d-line of all the negative lenses in the first group G1 and an average value vp of Abbe numbers to the d-line of all the positive lenses in the first group G1 satisfy the following conditional expressions (1) and (2), $$vn>40 \tag{1}$$

$$vp>70 \tag{2}$$

The conditional expression (1) is the expression defining the Abbe number of the negative lens in the first group G1, and the conditional expression (2) is the expression defining the Abbe number of the positive lens in the first group G1. To realize the zoom lens of high power ratio and high performance, it is required that the residual secondary spectrum is small, and the variation amount of chromatic aberration is small even in achieving the variable power at high power ratio. For this purpose, it is preferable that both the positive lens and the negative lens use a material of small dispersion, namely, the material with large Abbe number. The conditional expressions (1) and (2) are the expressions for excellently correcting the residual secondary spectrum of longitudinal chromatic aberration, especially at the telescopic end, in the zoom lens of this embodiment. If the lower limits of the conditional expressions (1) and (2) are exceeded, the residual secondary spectrum of longitudinal chromatic aberration is greater, so that color bleeding is likely to occur in the produced image.

Also, for the zoom lens according to this embodiment, it is preferable that a focal length f1 of the first lens group G11 and a focal length f2 of the second lens group G12 in the first lens group G1 satisfy the following conditional expression (3), $$0.7<f1/f2<4.2 \tag{3}$$

The conditional expression (3) is the expression defining the ratio of the focal length of the first lens group G11 to that of the second lens group G12. The focal length of the first lens group G11 and the focal length of the second lens group G12 have influence on the back focus of the first group. In this zoom lens, since the focal length of the first group G1 is scaled by the second group G2 to make the variable power, the variable range of the image formation magnification for the second group G2 in charge of the variable power is not appropriate, if the back focus of the first group G1 is not appropriate. For example, if the back focus of the first group G1 is too long, the second group G2 uses a magnification on the low power side, so that the zoom stroke is longer to obtain a desired power in the overall system, causing the size of the optical system to be larger. Or if the back focus of the first group G1 is too short, the second group G2 uses a magnification on the high power side, whereby there is nonconformance that the sensitivity of the variable power group is too high. For this reason, it is required to appropriate set the back focus of the first group G1.

If the lower limit of the conditional expression (3) is exceeded, the focal length of the first lens group G11 is shorter, whereby a retro ratio of the second lens group G12 must be increased to secure an appropriate back focus as the first group G1. Herein, the retro ratio means a ratio (Bf/f) of the back focus Bf to the focal length f. To increase the retro ratio of the second lens group G12, it is required to increase the refractive power of the negative lens L13 included in the second lens group G12. To strike a balance within the second lens group G12 with this, it is required to increase the refractive power of the positive lens following the negative lens L13. Thus, if the refractive power of each lens is too large, the occurrence amount of curvature of image or comatic aberration increases, making it difficult to make the correction excellently.

If the upper limit of the conditional expression (3) is exceeded, the focal length of the second lens group G12 is shorter. Though the state where the focal length of the second lens group G12 is short is the state where the power of each positive lens provided for the second lens group G12 is increased, this state is not preferable to keep excellent various kinds of aberration at the reference wavelength. Or the state where the focal length of the second lens group G12 is short can be acquired by increasing the number of positive lenses provided for the second lens group G12 without increasing the power of each positive lens. In this case, however, the overall length of lens is longer, and it is difficult to make the total system smaller. Hence, if the conditional expression (3) is satisfied, the chromatic aberration correction for the first group and the curvature of image and comatic aberration can be balanced excellently, and the larger size of the optical system is suppressed.

Further, in this zoom lens, to balance excellently the chromatic aberration correction for the first group and the curvature of image and comatic aberration, and to suppress the larger size of the optical system, the following conditional expression (3-2) is preferably satisfied.

$$0.8 < f1/f2 < 4.0 \qquad (3\text{-}2)$$

In the zoom lens as shown in FIGS. 1 to 5, focusing is effected by moving the whole of the first group G1 or the fourth group G4 in the optical axis direction. A focusing mechanism of the zoom lens of the invention is not limited to this, but an internal focusing method may be used as in the zoom lens as shown in FIGS. 6 to 10. In the zoom lenses as shown in FIGS. 6 to 10, focus from an infinite distance object to a closest focusing distance object is achieved by moving only the second lens group G12 of the first group G1 in the optical axis direction as indicated by the arrow under the second lens group G12 of each figure.

The zoom lens of the internal focusing method has the advantages that the effective diameter of the first group G1 can be reduced, the load of a drive system for driving the lens group can be reduced, and the rapid in-focus is allowed as compared with the method in which focusing is effected by moving the whole of the first group G1. Further, since the first lens group G11 disposed on the closest object side can be fixed, the air tight constitution is allowed to easily assure the dust proof and cloud proof properties. When this zoom lens is mounted on an imaging device used outdoors, for example, a surveillance camera, the device is possibly subjected to the outside air or the rain or wind, whereby it is effective that the internal focusing method that is easy to assure the air-tightness is employed.

If the internal focusing method with the above constitution is employed for the zoom lens of this invention, it is preferable that the focal length f1 of the first lens group G11 and the focal length f2 of the second lens group G12 in the first group G1 satisfy the following conditional expression (3-3), in which the range of the conditional expression (3) is further limited.

$$1.7 < f1/f2 < 3.6 \qquad (3\text{-}3)$$

In this case, further, to excellently balance the chromatic aberration correction for the first group and the curvature of image and comatic aberration and to further suppress an increase in the total length of the optical system, the following conditional expression (3-4) is preferably satisfied.

$$2.0 < f1/f2 < 3.0 \qquad (3\text{-}4)$$

Also, for the zoom lens according to this embodiment, it is preferable that an average value vn of Abbe numbers to the d-line of all the negative lenses in the first group G0 and an average value vp of Abbe numbers to the d-line of all the positive lenses in the first group G1 satisfy the following conditional expression (4)

$$vn+vp > 119 \qquad (4)$$

The conditional expression (4) is the expression defining the Abbe numbers of the negative lens and the positive lens in the first group G1. To realize the zoom lens of high power ratio and high performance, it is preferable that both the positive lens and the negative lens use a material of small dispersion, viz., the material with large Abbe number, as described with the conditional expressions (1) and (2). The conditional expression (4) is the expression for excellently correcting the residual secondary spectrum of longitudinal chromatic aberration, especially at the telescopic end, in the zoom lens of this embodiment. If the lower limit of the conditional expression (4) is exceeded, the residual secondary spectrum of longitudinal chromatic aberration is greater, so that color bleeding is likely to occur in the produced image.

Moreover, to suppress the residual secondary spectrum, it is preferable that the following conditional expression (4-2) is satisfied.

$$vn+vp > 124 \qquad (4\text{-}2)$$

EXAMPLES

Figure 21:
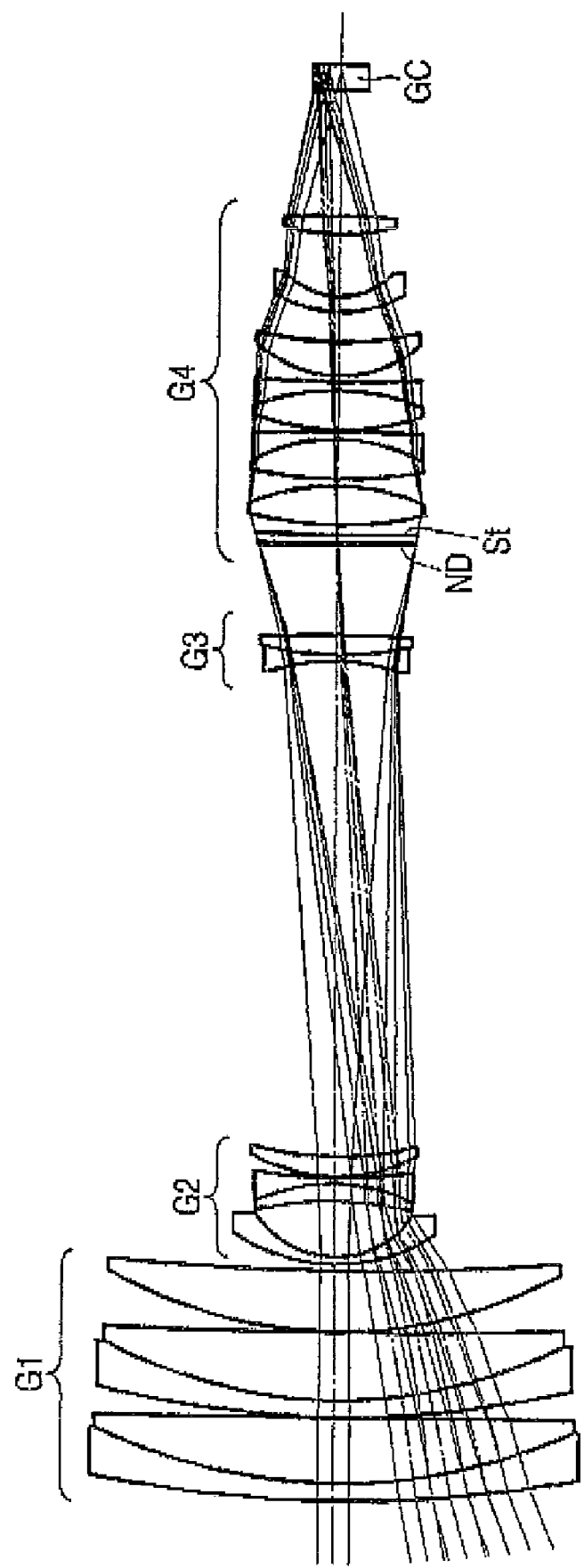
FIG. 21 is an optical path view according to the example 1 of the invention.

The specific numerical examples of the zoom lens according to this embodiment will be described below. In the following, the examples 1 to 10 are collectively described. FIGS. 1 to 10 show the cross-sectional views of lenses according to the examples 1 to 10. FIGS. 11 to 20 show the aberration views of the examples 1 to 10. FIG. 21 shows an optical path view, at four image heights including on-axis and off-axis, of the zoom lens in the example 1 at the wide-angle end at the time of in-focus at infinity.

The surface data and various kinds of data regarding the variable power in the examples 1 to 10 are shown in the table format for every example. In the surface data, the surface number is such that the surface of the component on the closest object side is the first, and the ith (i=1, 2, 3, ... ) surface has the number sequentially increasing toward the image side. Ri denotes the radius of curvature for the ith surface, and Di denotes the on-axis surface spacing on the optical axis Z between the ith surface and the (i+1)th surface. Also, Ndj denotes the refractive index to the d-line (wavelength 587.6nm) of the jth (j=1, 2, 3, ... ) optical element with the number j sequentially increasing toward the image side in which the lens on the closest object side is the first, and vdj denotes the Abbe number to the d-line of the jth optical element. The surface data is represented, including the ND filter ND, aperture diaphragm St, and cover glass GC. The radius of curvature in the surface data is positive if the surface is convex on the object side, or negative if it is convex on the image side.

In the surface data, the spacing is changed to achieve the variable power. The spacing between the first group G1 and the second group G2, the spacing between the second group G2 and the third group G3, and the spacing between the third group G3 and the fourth group G4 are variable D1, variable D2 and variable D3. In various kinds of data, the values of variable D1, variable D2 and variable D3 at the wide-angle end, middle position and telescopic end are indicated in the items of D1, D2 and D3. Also, in various kinds of data, the variable power ratio is indicated on the top stage, the focal length, F-number, and the half angle of view at the wide-angle end, middle position and telescopic end are indicated in the items of f, FNo, and half angle of view. In the surface data and various kinds of data, the unit is mm, unless otherwise specified.

Example 1

Surface data

| Surface number | Ri | Di | Ndj | vdj |
|---|---|---|---|---|
| 1 | 193.321 | 2.80 | 1.75500 | 52.3 |
| 2 | 86.502 | 10.42 | 1.61800 | 63.3 |
| 3 | 6398.973 | 0.15 | 1.00000 | |
| 4 | 152.074 | 2.70 | 1.80609 | 40.9 |
| 5 | 75.206 | 10.93 | 1.43875 | 94.9 |
| 6 | 825.576 | 0.15 | 1.00000 | |
| 7 | 69.946 | 9.87 | 1.49700 | 81.5 |
| 8 | 404.031 | Variable D1 | 1.00000 | |
| 9 | 27.807 | 1.20 | 1.83480 | 42.7 |
| 10 | 14.597 | 9.03 | 1.00000 | |
| 11 | −53.981 | 2.81 | 1.80809 | 22.8 |
| 12 | −29.438 | 1.00 | 1.80400 | 46.6 |
| 13 | 74.759 | 0.20 | 1.00000 | |
| 14 | 26.371 | 3.19 | 1.80809 | 22.8 |
| 15 | 47.060 | Variable D2 | 1.00000 | |
| 16 | −34.305 | 1.00 | 1.80400 | 46.6 |
| 17 | 48.676 | 3.25 | 1.80517 | 25.4 |
| 18 | −190.995 | Variable D3 | 1.00000 | |
| 19 | ∞ | 0.30 | 1.51633 | 64.1 |
| 20 | ∞ | 1.30 | 1.00000 | |
| 21 | ∞ | 1.50 | 1.00000 | |
| (aperture diaphragm) | | | | |
| 22 | 54.326 | 6.39 | 1.49700 | 81.5 |
| 23 | −34.405 | 1.00 | 1.00000 | |
| 24 | 64.706 | 6.60 | 1.49700 | 81.5 |
| 25 | −27.631 | 1.30 | 1.81600 | 46.6 |
| 26 | −258.940 | 0.15 | 1.00000 | |
| 27 | 38.490 | 6.51 | 1.49700 | 81.5 |
| 28 | −36.846 | 1.30 | 1.81600 | 46.6 |
| 29 | 194.388 | 1.00 | 1.00000 | |
| 30 | 18.860 | 5.49 | 1.48749 | 70.2 |
| 31 | 53.779 | 4.89 | 1.00000 | |
| 32 | 19.922 | 2.50 | 1.77250 | 49.6 |
| 33 | 11.716 | 10.00 | 1.00000 | |
| 34 | 32.377 | 2.96 | 1.51741 | 52.4 |
| 35 | −136.598 | 20.00 | 1.00000 | |
| 36 | ∞ | 4.00 | 1.51633 | 64.1 |
| Image surface | ∞ | 0.00 | 1.00000 | |

Various kinds of data
Variable power ratio 22.00

| | f | D1 | D2 | D3 | FNo. | Half angle of view (degree) |
|---|---|---|---|---|---|---|
| Wide-angle end | 10.31 | 1.00 | 80.42 | 14.68 | 2.00 | 20.4 |
| Middle | 51.54 | 61.47 | 13.77 | 20.86 | 2.00 | 4.2 |
| Telescopic end | 226.78 | 84.01 | 10.92 | 1.18 | 3.02 | 0.9 |

Example 2

Surface data

| Surface number | Ri | Di | Ndj | vdj |
|---|---|---|---|---|
| 1 | 167.322 | 2.80 | 1.75500 | 52.3 |
| 2 | 77.232 | 10.62 | 1.61800 | 63.3 |
| 3 | 637.266 | 0.15 | 1.00000 | |
| 4 | 177.459 | 2.70 | 1.80609 | 40.9 |
| 5 | 79.104 | 9.81 | 1.43875 | 94.9 |
| 6 | 512.121 | 0.15 | 1.00000 | |
| 7 | 77.089 | 9.47 | 1.49700 | 81.5 |
| 8 | 676.519 | 0.15 | 1.00000 | |
| 9 | 99.350 | 5.00 | 1.49700 | 81.5 |
| 10 | 169.814 | Variable D1 | 1.00000 | |
| 11 | 28.463 | 1.20 | 1.83480 | 42.7 |
| 12 | 14.462 | 9.51 | 1.00000 | |
| 13 | −54.933 | 2.85 | 1.80809 | 22.8 |
| 14 | −28.844 | 1.00 | 1.80400 | 46.6 |
| 15 | 71.348 | 0.20 | 1.00000 | |
| 16 | 25.893 | 3.14 | 1.80809 | 22.8 |
| 17 | 45.741 | Variable D2 | 1.00000 | |
| 18 | −33.220 | 1.00 | 1.80400 | 46.6 |
| 19 | 42.484 | 3.41 | 1.80517 | 25.4 |
| 20 | −216.680 | Variable D3 | 1.00000 | |
| 21 | ∞ | 0.30 | 1.51633 | 64.1 |
| 22 | ∞ | 1.30 | 1.00000 | |
| 23 | ∞ | 1.50 | 1.00000 | |
| (aperture diaphragm) | | | | |
| 24 | 123.308 | 5.73 | 1.49700 | 81.5 |
| 25 | −31.737 | 1.00 | 1.00000 | |
| 26 | 60.159 | 6.99 | 1.49700 | 81.5 |
| 27 | −29.094 | 1.30 | 1.81600 | 46.6 |
| 28 | −335.528 | 0.15 | 1.00000 | |
| 29 | 30.952 | 7.43 | 1.49700 | 81.5 |
| 30 | −46.689 | 1.30 | 1.81600 | 46.6 |
| 31 | 109.600 | 1.00 | 1.00000 | |
| 32 | 23.796 | 16.47 | 1.48749 | 70.2 |
| 33 | 821.711 | 1.92 | 1.00000 | |
| 34 | 25.892 | 2.50 | 1.77250 | 49.6 |
| 35 | 11.797 | 3.11 | 1.00000 | |
| 36 | 19.646 | 3.32 | 1.51741 | 52.4 |
| 37 | 339.805 | 19.99 | 1.00000 | |
| 38 | ∞ | 4.00 | 1.51633 | 64.1 |
| Image surface | ∞ | 0.00 | 1.00000 | |

Various kinds of data
Variable power ratio 21.99

| | f | D1 | D2 | D3 | FNo. | Half angle of view (degree) |
|---|---|---|---|---|---|---|
| Wide-angle end | 10.31 | 1.03 | 72.01 | 16.48 | 2.00 | 20.3 |
| Middle | 51.53 | 56.00 | 12.05 | 21.46 | 2.00 | 4.2 |
| Telescopic end | 226.75 | 75.90 | 12.43 | 1.19 | 3.02 | 0.9 |

Example 3

Surface data

| Surface number | Ri | Di | Ndj | vdj |
|---|---|---|---|---|
| 1 | 124.957 | 2.80 | 1.81600 | 46.6 |
| 2 | 90.082 | 1.20 | 1.00000 | |
| 3 | 88.265 | 10.70 | 1.49700 | 81.5 |
| 4 | −2074.527 | 0.15 | 1.00000 | |
| 5 | 139.499 | 2.70 | 1.78589 | 44.2 |
| 6 | 67.527 | 11.02 | 1.49700 | 81.5 |
| 7 | 331.063 | 0.15 | 1.00000 | |
| 8 | 71.541 | 8.22 | 1.49700 | 81.5 |
| 9 | 218.025 | Variable D1 | 1.00000 | |
| 10 | 29.158 | 1.20 | 1.83480 | 42.7 |
| 11 | 13.978 | 8.04 | 1.00000 | |
| 12 | −43.957 | 2.78 | 1.80809 | 22.8 |
| 13 | −25.551 | 1.00 | 1.80400 | 46.6 |
| 14 | 98.979 | 0.20 | 1.00000 | |
| 15 | 27.205 | 3.12 | 1.80809 | 22.8 |
| 16 | 53.326 | Variable D2 | 1.00000 | |
| 17 | −35.342 | 1.00 | 1.80400 | 46.6 |
| 18 | 54.010 | 3.20 | 1.80517 | 25.4 |
| 19 | −163.686 | Variable D3 | 1.00000 | |
| 20 | ∞ | 0.30 | 1.51633 | 64.1 |
| 21 | ∞ | 1.30 | 1.00000 | |

-continued

| | | | | |
|---|---|---|---|---|
| 22 (aperture diaphragm) | ∞ | 1.50 | 1.00000 | |
| 23 | 53.155 | 6.63 | 1.49700 | 81.5 |
| 24 | −33.962 | 1.00 | 1.00000 | |
| 25 | 74.259 | 6.61 | 1.49700 | 81.5 |
| 26 | −27.136 | 1.30 | 1.81600 | 46.6 |
| 27 | −196.557 | 0.15 | 1.00000 | |
| 28 | 41.173 | 6.74 | 1.49700 | 81.5 |
| 29 | −33.762 | 1.30 | 1.81600 | 46.6 |
| 30 | 222.171 | 1.00 | 1.00000 | |
| 31 | 19.929 | 5.27 | 1.48749 | 70.2 |
| 32 | 59.218 | 6.67 | 1.00000 | |
| 33 | 19.768 | 2.50 | 1.77250 | 49.6 |
| 34 | 12.034 | 10.00 | 1.00000 | |
| 35 | 30.351 | 3.09 | 1.51741 | 52.4 |
| 36 | −142.450 | 20.00 | 1.00000 | |
| 37 | ∞ | 4.00 | 1.51633 | 64.1 |
| Image surface | ∞ | 0.00 | 1.00000 | |

Various kinds of data
Variable power ratio 22.00

| | f | D1 | D2 | D3 | FNo. | Half angle of view (degree) |
|---|---|---|---|---|---|---|
| Wide-angle end | 10.31 | 1.00 | 82.39 | 11.76 | 2.00 | 20.4 |
| Middle | 51.55 | 61.15 | 14.37 | 19.63 | 2.00 | 4.2 |
| Telescopic end | 226.82 | 83.54 | 10.42 | 1.18 | 3.02 | 0.9 |

Example 4

Surface data

| Surface number | Ri | Di | Ndj | vdj |
|---|---|---|---|---|
| 1 | 116.288 | 2.80 | 1.75500 | 52.3 |
| 2 | 69.891 | 13.27 | 1.61800 | 63.3 |
| 3 | −4175.252 | 0.15 | 1.00000 | |
| 4 | 352.592 | 2.70 | 1.81600 | 46.6 |
| 5 | 67.097 | 1.20 | 1.00000 | |
| 6 | 67.322 | 13.79 | 1.49700 | 81.5 |
| 7 | −1407.834 | 0.15 | 1.00000 | |
| 8 | 67.375 | 9.53 | 1.49700 | 81.5 |
| 9 | 271.305 | Variable D1 | 1.00000 | |
| 10 | 30.924 | 1.20 | 1.83480 | 42.7 |
| 11 | 13.679 | 7.73 | 1.00000 | |
| 12 | −38.334 | 2.13 | 1.80809 | 22.8 |
| 13 | −29.122 | 1.00 | 1.80400 | 46.6 |
| 14 | 75.074 | 0.20 | 1.00000 | |
| 15 | 29.957 | 3.64 | 1.80809 | 22.8 |
| 16 | 144.870 | Variable D2 | 1.00000 | |
| 17 | −33.767 | 1.00 | 1.80400 | 46.6 |
| 18 | 75.240 | 2.90 | 1.80517 | 25.4 |
| 19 | −153.501 | Variable D3 | 1.00000 | |
| 20 | ∞ | 0.30 | 1.51633 | 64.1 |
| 21 | ∞ | 1.30 | 1.00000 | |
| 22 (aperture diaphragm) | ∞ | 1.50 | 1.00000 | |
| 23 | 58.857 | 6.25 | 1.49700 | 81.5 |
| 24 | −34.883 | 1.00 | 1.00000 | |
| 25 | 57.238 | 6.62 | 1.49700 | 81.5 |
| 26 | −29.875 | 1.30 | 1.81600 | 46.6 |
| 27 | −207.426 | 0.15 | 1.00000 | |
| 28 | 39.885 | 6.53 | 1.49700 | 81.5 |
| 29 | −35.964 | 1.30 | 1.81600 | 46.6 |
| 30 | 185.371 | 1.00 | 1.00000 | |
| 31 | 18.709 | 5.52 | 1.48749 | 70.2 |
| 32 | 60.262 | 4.26 | 1.00000 | |
| 33 | 19.035 | 2.50 | 1.77250 | 49.6 |
| 34 | 11.339 | 10.00 | 1.00000 | |
| 35 | 43.320 | 2.68 | 1.51741 | 52.4 |
| 36 | −102.932 | 19.97 | 1.00000 | |
| 37 | ∞ | 4.00 | 1.51633 | 64.1 |
| Image surface | ∞ | 0.00 | 1.00000 | |

Various kinds of data
Variable power ratio 22.01

| | f | D1 | D2 | D3 | FNo. | Half angle of view (degree) |
|---|---|---|---|---|---|---|
| Wide-angle end | 10.31 | 1.00 | 79.11 | 12.17 | 2.00 | 20.3 |
| Middle | 51.57 | 59.71 | 13.08 | 19.49 | 2.00 | 4.2 |
| Telescopic end | 226.91 | 81.54 | 9.33 | 1.41 | 3.02 | 0.9 |

Example 5

Surface data

| Surface number | Ri | Di | Ndj | vdj |
|---|---|---|---|---|
| 1 | 128.402 | 2.80 | 1.77250 | 49.6 |
| 2 | 71.544 | 11.94 | 1.61800 | 63.3 |
| 3 | 922.532 | 0.15 | 1.00000 | |
| 4 | 138.728 | 2.70 | 1.80439 | 39.6 |
| 5 | 68.015 | 1.20 | 1.00000 | |
| 6 | 67.212 | 10.58 | 1.49700 | 81.5 |
| 7 | 269.290 | 0.15 | 1.00000 | |
| 8 | 75.576 | 9.00 | 1.49700 | 81.5 |
| 9 | 400.336 | Variable D1 | 1.00000 | |
| 10 | 28.311 | 1.20 | 1.83480 | 42.7 |
| 11 | 13.733 | 8.02 | 1.00000 | |
| 12 | −44.429 | 2.69 | 1.80809 | 22.8 |
| 13 | −26.258 | 1.00 | 1.80400 | 46.6 |
| 14 | 85.505 | 0.20 | 1.00000 | |
| 15 | 26.723 | 3.16 | 1.80809 | 22.8 |
| 16 | 54.021 | Variable D2 | 1.00000 | |
| 17 | −34.745 | 1.00 | 1.80400 | 46.6 |
| 18 | 47.108 | 3.34 | 1.80517 | 25.4 |
| 19 | −172.107 | Variable D3 | 1.00000 | |
| 20 | ∞ | 0.30 | 1.51633 | 64.1 |
| 21 | ∞ | 1.30 | 1.00000 | |
| 22 (aperture diaphragm) | ∞ | 1.50 | 1.00000 | |
| 23 | 50.578 | 6.74 | 1.49700 | 81.5 |
| 24 | −33.537 | 1.00 | 1.00000 | |
| 25 | 72.206 | 6.68 | 1.49700 | 81.5 |
| 26 | −26.442 | 1.30 | 1.81600 | 46.6 |
| 27 | −185.348 | 0.15 | 1.00000 | |
| 28 | 41.048 | 6.76 | 1.49700 | 81.5 |
| 29 | −32.524 | 1.30 | 1.81600 | 46.6 |
| 30 | 187.061 | 1.00 | 1.00000 | |
| 31 | 19.956 | 5.31 | 1.48749 | 70.2 |
| 32 | 64.511 | 6.55 | 1.00000 | |
| 33 | 19.813 | 2.50 | 1.77250 | 49.6 |
| 34 | 12.027 | 10.00 | 1.00000 | |
| 35 | 29.832 | 3.11 | 1.51741 | 52.4 |
| 36 | −141.441 | 20.00 | 1.00000 | |
| 37 | ∞ | 4.00 | 1.51633 | 64.1 |
| Image surface | ∞ | 0.00 | 1.00000 | |

Various kinds of data
Variable power ratio 21.99

| | f | D1 | D2 | D3 | FNo. | Half angle of view (degree) |
|---|---|---|---|---|---|---|
| Wide-angle end | 10.31 | 1.00 | 80.90 | 11.49 | 2.00 | 20.4 |
| Middle | 51.53 | 60.08 | 14.34 | 18.97 | 2.00 | 4.2 |
| Telescopic end | 226.75 | 82.09 | 10.12 | 1.18 | 3.02 | 0.9 |

Example 6

Surface data

| Surface number | Ri | Di | Ndj | vdj |
|---|---|---|---|---|
| 1 | 188.513 | 2.80 | 1.75500 | 52.3 |
| 2 | 80.515 | 11.21 | 1.61800 | 63.3 |
| 3 | 7972.662 | 6.77 | 1.00000 | |
| 4 | 177.759 | 2.70 | 1.81600 | 46.6 |
| 5 | 63.837 | 13.44 | 1.49700 | 81.5 |
| 6 | 1194.823 | 0.15 | 1.00000 | |
| 7 | 64.101 | 11.90 | 1.49700 | 81.5 |
| 8 | 979.450 | Variable D1 | 1.00000 | |
| 9 | 25.672 | 1.20 | 1.83480 | 42.7 |
| 10 | 13.474 | 8.34 | 1.00000 | |
| 11 | −45.853 | 2.44 | 1.80809 | 22.8 |
| 12 | −29.149 | 1.00 | 1.80400 | 46.6 |
| 13 | 56.591 | 0.20 | 1.00000 | |
| 14 | 26.059 | 3.44 | 1.80809 | 22.8 |
| 15 | 63.559 | Variable D2 | 1.00000 | |
| 16 | −32.763 | 1.00 | 1.80400 | 46.6 |
| 17 | 77.809 | 2.68 | 1.80517 | 25.4 |
| 18 | −174.882 | Variable D3 | 1.00000 | |
| 19 | ∞ | 0.30 | 1.51633 | 64.1 |
| 20 | ∞ | 1.30 | 1.00000 | |
| 21 | ∞ | 1.49 | 1.00000 | |
| (aperture diaphragm) | | | | |
| 22 | 62.975 | 5.63 | 1.49700 | 81.5 |
| 23 | −36.334 | 1.00 | 1.00000 | |
| 24 | 55.292 | 6.31 | 1.49700 | 81.5 |
| 25 | −30.866 | 1.30 | 1.81600 | 46.6 |
| 26 | −220.449 | 0.15 | 1.00000 | |
| 27 | 35.569 | 6.42 | 1.49700 | 81.5 |
| 28 | −39.716 | 1.30 | 1.81600 | 46.6 |
| 29 | 162.228 | 1.00 | 1.00000 | |
| 30 | 18.094 | 5.65 | 1.48749 | 70.2 |
| 31 | 66.777 | 2.73 | 1.00000 | |
| 32 | 18.706 | 2.50 | 1.77250 | 49.6 |
| 33 | 10.923 | 10.00 | 1.00000 | |
| 34 | 41.319 | 2.56 | 1.51741 | 52.4 |
| 35 | −158.506 | 19.99 | 1.00000 | |
| 36 | ∞ | 4.00 | 1.51633 | 64.1 |
| Image surface | ∞ | 0.00 | 1.00000 | |

Various kinds of data
Variable power ratio 21.99

| | f | D1 | D2 | D3 | FNo. | Half angle of view (degree) |
|---|---|---|---|---|---|---|
| Wide-angle end | 10.31 | 1.00 | 73.71 | 14.41 | 2.00 | 20.2 |
| Middle | 51.53 | 56.52 | 12.21 | 20.39 | 2.00 | 4.2 |
| Telescopic end | 226.75 | 76.98 | 10.98 | 1.16 | 3.01 | 0.9 |

Example 7

Surface data

| Surface number | Ri | Di | Ndj | vdj |
|---|---|---|---|---|
| 1 | 157.240 | 2.80 | 1.81600 | 46.6 |
| 2 | 84.440 | 1.75 | 1.00000 | |
| 3 | 84.111 | 10.26 | 1.61800 | 63.3 |
| 4 | 1309.593 | 6.52 | 1.00000 | |
| 5 | 119.475 | 2.70 | 1.83480 | 42.7 |
| 6 | 60.287 | 12.52 | 1.49700 | 81.5 |
| 7 | 292.856 | 0.15 | 1.00000 | |
| 8 | 65.436 | 11.16 | 1.49700 | 81.5 |
| 9 | 573.914 | Variable D1 | 1.00000 | |
| 10 | 27.673 | 1.20 | 1.83480 | 42.7 |
| 11 | 13.229 | 8.06 | 1.00000 | |
| 12 | −46.702 | 2.80 | 1.80809 | 22.8 |
| 13 | −25.544 | 1.00 | 1.80400 | 46.6 |
| 14 | 84.249 | 0.20 | 1.00000 | |
| 15 | 24.508 | 4.16 | 1.80809 | 22.8 |
| 16 | 43.003 | Variable D2 | 1.00000 | |
| 17 | −32.886 | 1.00 | 1.80400 | 46.6 |
| 18 | 61.671 | 2.91 | 1.80809 | 22.8 |
| 19 | −176.059 | Variable D3 | 1.00000 | |
| 20 | ∞ | 0.30 | 1.51633 | 64.1 |
| 21 | ∞ | 1.30 | 1.00000 | |
| 22 | ∞ | 1.50 | 1.00000 | |
| (aperture diaphragm) | | | | |
| 23 | 61.680 | 6.13 | 1.49700 | 81.5 |
| 24 | −32.577 | 1.00 | 1.00000 | |
| 25 | 57.722 | 6.62 | 1.49700 | 81.5 |
| 26 | −27.887 | 1.30 | 1.81600 | 46.6 |
| 27 | −435.540 | 0.15 | 1.00000 | |
| 28 | 32.531 | 7.44 | 1.49700 | 81.5 |
| 29 | −36.914 | 1.30 | 1.81600 | 46.6 |
| 30 | 142.913 | 1.00 | 1.00000 | |
| 31 | 18.319 | 6.19 | 1.48749 | 70.2 |
| 32 | 61.709 | 3.03 | 1.00000 | |
| 33 | 19.278 | 2.50 | 1.77250 | 49.6 |
| 34 | 11.254 | 10.00 | 1.00000 | |
| 35 | 32.169 | 2.91 | 1.51741 | 52.4 |
| 36 | −158.533 | 20.00 | 1.00000 | |
| 37 | ∞ | 4.00 | 1.51633 | 64.1 |
| Image surface | ∞ | 0.00 | 1.00000 | |

Various kinds of data
Variable power ratio 22.00

| | f | D1 | D2 | D3 | FNo. | Half angle of view (degree) |
|---|---|---|---|---|---|---|
| Wide-angle end | 10.30 | 1.03 | 71.62 | 13.48 | 2.00 | 20.3 |
| Middle | 51.50 | 54.00 | 12.47 | 19.67 | 2.00 | 4.2 |
| Telescopic end | 226.59 | 73.22 | 11.74 | 1.18 | 3.01 | 0.9 |

Example 8

Surface data

| Surface number | Ri | Di | Ndj | vdj |
|---|---|---|---|---|
| 1 | 155.347 | 2.80 | 1.81600 | 46.6 |
| 2 | 84.362 | 1.83 | 1.00000 | |
| 3 | 84.601 | 10.23 | 1.61800 | 63.3 |
| 4 | 1379.158 | 6.78 | 1.00000 | |
| 5 | 104.608 | 2.70 | 1.88299 | 40.7 |
| 6 | 63.115 | 11.39 | 1.43875 | 94.9 |
| 7 | 256.314 | 0.15 | 1.00000 | |
| 8 | 67.680 | 10.71 | 1.49700 | 81.5 |
| 9 | 561.147 | Variable D1 | 1.00000 | |
| 10 | 26.607 | 1.20 | 1.83480 | 42.7 |
| 11 | 13.309 | 8.22 | 1.00000 | |
| 12 | −47.556 | 2.80 | 1.80809 | 22.8 |
| 13 | −25.787 | 1.00 | 1.80400 | 46.6 |
| 14 | 69.831 | 0.20 | 1.00000 | |
| 15 | 24.708 | 3.12 | 1.80809 | 22.8 |
| 16 | 45.304 | Variable D2 | 1.00000 | |
| 17 | −31.909 | 1.00 | 1.80400 | 46.6 |
| 18 | 58.528 | 2.98 | 1.80809 | 22.8 |
| 19 | −169.885 | Variable D3 | 1.00000 | |
| 20 | ∞ | 0.30 | 1.51633 | 64.1 |
| 21 | ∞ | 1.30 | 1.00000 | |
| 22 | ∞ | 1.50 | 1.00000 | |
| (aperture diaphragm) | | | | |
| 23 | 56.723 | 6.41 | 1.49700 | 81.5 |
| 24 | −31.701 | 1.00 | 1.00000 | |
| 25 | 64.287 | 6.72 | 1.49700 | 81.5 |

-continued

| | | | | |
|---|---|---|---|---|
| 26 | −25.845 | 1.30 | 1.81600 | 46.6 |
| 27 | −238.755 | 0.15 | 1.00000 | |
| 28 | 35.316 | 6.79 | 1.49700 | 81.5 |
| 29 | −35.497 | 1.30 | 1.81600 | 46.6 |
| 30 | 173.476 | 1.00 | 1.00000 | |
| 31 | 18.861 | 6.49 | 1.48749 | 70.2 |
| 32 | 60.261 | 4.08 | 1.00000 | |
| 33 | 20.241 | 2.50 | 1.77250 | 49.6 |
| 34 | 11.608 | 10.00 | 1.00000 | |
| 35 | 31.784 | 3.09 | 1.51741 | 52.4 |
| 36 | −102.772 | 20.00 | 1.00000 | |
| 37 | ∞ | 4.00 | 1.51633 | 64.1 |
| Image surface | ∞ | 0.00 | 1.00000 | |

Various kinds of data
Variable power ratio 22.01

| | f | D1 | D2 | D3 | FNo. | Half angle of view (degree) |
|---|---|---|---|---|---|---|
| Wide-angle end | 10.30 | 1.00 | 73.40 | 12.55 | 2.00 | 20.3 |
| Middle | 51.52 | 55.25 | 13.03 | 18.66 | 2.00 | 4.2 |
| Telescopic end | 226.67 | 75.25 | 10.54 | 1.15 | 3.01 | 0.9 |

Example 9

Surface data

| Surface number | Ri | Di | Ndj | vdj |
|---|---|---|---|---|
| 1 | 123.353 | 2.80 | 1.77250 | 49.6 |
| 2 | 80.544 | 1.93 | 1.00000 | |
| 3 | 81.244 | 11.45 | 1.49700 | 81.5 |
| 4 | −3030.766 | 6.89 | 1.00000 | |
| 5 | 121.192 | 2.70 | 1.83480 | 42.7 |
| 6 | 65.002 | 3.00 | 1.00000 | |
| 7 | 66.565 | 10.49 | 1.49700 | 81.5 |
| 8 | 248.632 | 0.15 | 1.00000 | |
| 9 | 70.337 | 10.23 | 1.49700 | 81.5 |
| 10 | 548.746 | Variable D1 | 1.00000 | |
| 11 | 33.735 | 1.20 | 1.83480 | 42.7 |
| 12 | 13.976 | 7.62 | 1.00000 | |
| 13 | −41.642 | 2.61 | 1.80809 | 22.8 |
| 14 | −25.854 | 1.00 | 1.80400 | 46.6 |
| 15 | 103.513 | 0.20 | 1.00000 | |
| 16 | 29.193 | 3.30 | 1.80809 | 22.8 |
| 17 | 80.730 | Variable D2 | 1.00000 | |
| 18 | −31.151 | 1.00 | 1.80400 | 46.6 |
| 19 | 103.324 | 2.62 | 1.80809 | 22.8 |
| 20 | −140.995 | Variable D3 | 1.00000 | |
| 21 | ∞ | 0.30 | 1.51633 | 64.1 |
| 22 | ∞ | 1.30 | 1.00000 | |
| 23 | ∞ | 1.50 | 1.00000 | |
| (aperture diaphragm) | | | | |
| 24 | 69.952 | 5.88 | 1.49700 | 81.5 |
| 25 | −33.427 | 1.00 | 1.00000 | |
| 26 | 57.681 | 6.56 | 1.49700 | 81.5 |
| 27 | −29.144 | 1.30 | 1.81600 | 46.6 |
| 28 | −220.963 | 0.15 | 1.00000 | |
| 29 | 32.930 | 6.71 | 1.49700 | 81.5 |
| 30 | −41.050 | 1.30 | 1.81600 | 46.6 |
| 31 | 118.987 | 1.00 | 1.00000 | |
| 32 | 18.556 | 5.65 | 1.48749 | 70.2 |
| 33 | 69.856 | 3.31 | 1.00000 | |
| 34 | 19.647 | 2.50 | 1.77250 | 49.6 |
| 35 | 11.305 | 10.00 | 1.00000 | |
| 36 | 40.639 | 2.73 | 1.51741 | 52.4 |
| 37 | −108.561 | 19.99 | 1.00000 | |
| 38 | ∞ | 4.00 | 1.51633 | 64.1 |
| Image surface | ∞ | 0.00 | 1.00000 | |

Various kinds of data
Variable power ratio 21.99

| | f | D1 | D2 | D3 | FNo. | Half angle of view (degree) |
|---|---|---|---|---|---|---|
| Wide-angle end | 10.31 | 1.00 | 71.88 | 14.74 | 2.00 | 20.3 |
| Middle | 51.53 | 55.55 | 11.58 | 20.50 | 2.00 | 4.2 |
| Telescopic end | 226.73 | 75.42 | 11.03 | 1.18 | 3.01 | 0.9 |

Example 10

Surface data

| Surface number | Ri | Di | Ndj | vdj |
|---|---|---|---|---|
| 1 | 172.905 | 2.80 | 1.75500 | 52.3 |
| 2 | 77.306 | 11.23 | 1.61800 | 63.3 |
| 3 | 1373.080 | 6.15 | 1.00000 | |
| 4 | 209.884 | 2.70 | 1.83480 | 42.7 |
| 5 | 73.515 | 10.21 | 1.49700 | 81.5 |
| 6 | 385.976 | 0.15 | 1.00000 | |
| 7 | 76.349 | 10.26 | 1.49700 | 81.5 |
| 8 | 2485.442 | 0.15 | 1.00000 | |
| 9 | 82.968 | 5.19 | 1.49700 | 81.5 |
| 10 | 145.551 | Variable D1 | 1.00000 | |
| 11 | 28.133 | 1.20 | 1.83480 | 42.7 |
| 12 | 13.835 | 8.48 | 1.00000 | |
| 13 | −48.437 | 2.83 | 1.80809 | 22.8 |
| 14 | −26.840 | 1.00 | 1.80400 | 46.6 |
| 15 | 82.538 | 0.20 | 1.00000 | |
| 16 | 25.334 | 3.21 | 1.80809 | 22.8 |
| 17 | 46.504 | Variable D2 | 1.00000 | |
| 18 | −33.495 | 1.00 | 1.80400 | 46.6 |
| 19 | 45.719 | 3.20 | 1.80517 | 25.4 |
| 20 | −223.469 | Variable D3 | 1.00000 | |
| 21 | ∞ | 0.30 | 1.51633 | 64.1 |
| 22 | ∞ | 1.30 | 1.00000 | |
| 23 | ∞ | 1.50 | 1.00000 | |
| (aperture diaphragm) | | | | |
| 24 | 183.001 | 4.94 | 1.49700 | 81.5 |
| 25 | −32.028 | 1.00 | 1.00000 | |
| 26 | 58.619 | 6.69 | 1.49700 | 81.5 |
| 27 | −27.562 | 1.30 | 1.81600 | 46.6 |
| 28 | −305.923 | 0.15 | 1.00000 | |
| 29 | 25.745 | 8.20 | 1.49700 | 81.5 |
| 30 | −53.777 | 1.30 | 1.81600 | 46.6 |
| 31 | 119.418 | 1.00 | 1.00000 | |
| 32 | 20.598 | 7.77 | 1.48749 | 70.2 |
| 33 | 120.955 | 1.01 | 1.00000 | |
| 34 | 19.858 | 2.50 | 1.77250 | 49.6 |
| 35 | 11.146 | 10.00 | 1.00000 | |
| 36 | 40.519 | 2.64 | 1.51741 | 52.4 |
| 37 | −137.356 | 20.00 | 1.00000 | |
| 38 | ∞ | 4.00 | 1.51633 | 64.1 |
| Image surface | ∞ | 0.00 | 1.00000 | |

Various kinds of data
Variable power ratio 21.99

| | f | D1 | D2 | D3 | FNo. | Half angle of view (degree) |
|---|---|---|---|---|---|---|
| Wide-angle end | 10.31 | 1.00 | 66.93 | 18.51 | 2.00 | 20.1 |
| Middle | 51.53 | 52.71 | 10.62 | 23.11 | 2.00 | 4.2 |
| Telescopic end | 226.75 | 70.99 | 14.27 | 1.18 | 3.01 | 0.9 |

A table 1 shows the values vn, vp and vn+vp corresponding to the conditional expressions (1), (2) and (4) in the zoom lenses of the examples 1 to 10, along with the Abbe number of each lens associated. In the table 1, the Abbe numbers of the negative lens L11, positive lens L12, negative lens L13, positive lens L14, positive lens L15, and positive lens L16 of the first group G1 are denotes as vn1, vp1, vn2, vp2, vp3 and vp4.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| vn1 | 52.3 | 52.3 | 46.6 | 52.3 | 49.6 | 52.3 | 46.6 | 46.6 | 49.6 | 52.3 |
| vp1 | 63.3 | 63.3 | 81.5 | 63.3 | 63.3 | 63.3 | 63.3 | 63.3 | 81.5 | 63.3 |
| vn2 | 40.9 | 40.9 | 44.2 | 46.6 | 39.6 | 46.6 | 42.7 | 40.7 | 42.7 | 42.7 |
| vp2 | 94.9 | 94.9 | 81.5 | 81.5 | 81.5 | 81.5 | 81.5 | 94.9 | 81.5 | 81.5 |
| vp3 | 81.5 | 81.5 | 81.5 | 81.5 | 81.5 | 81.5 | 81.5 | 81.5 | 81.5 | 81.5 |
| vp4 | — | 81.5 | — | — | — | — | — | — | — | 81.5 |
| vn | 46.6 | 46.6 | 45.4 | 49.5 | 44.6 | 49.5 | 44.7 | 43.7 | 46.2 | 47.5 |
| vp | 79.9 | 80.3 | 81.5 | 75.4 | 75.4 | 75.4 | 75.4 | 79.9 | 81.5 | 77.0 |
| vn + vp | 126.5 | 126.9 | 126.9 | 124.9 | 120.0 | 124.9 | 120.1 | 123.6 | 127.7 | 124.5 |

A table 2 shows the value f1/f2 corresponding to the conditional expression (3) in the zoom lenses of the examples 1 to 10, along with the focal length f1 of the first lens group G11 and the focal length f2 of the second lens group G12. As will be clear from the tables 1 and 2, all the conditional expressions (1) to (4) are satisfied in the examples 1 to 10. Also, the conditional expression (4-2) is satisfied in the examples 1 to 4, 6, 9 and 10. And all of the conditional expressions (3-2), (3-3) and (3-4) are satisfied in the example 8.

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| f1 | 447.03 | 553.75 | 295.33 | 213.06 | 309.32 | 446.71 | 402.37 | 396.44 | 330.99 | 461.27 |
| f2 | 172.58 | 145.68 | 218.19 | 264.50 | 201.99 | 154.74 | 156.05 | 162.22 | 170.04 | 142.05 |
| f1/f2 | 2.59 | 3.80 | 1.35 | 0.81 | 1.53 | 2.89 | 2.58 | 2.44 | 1.95 | 3.25 |

FIGS. 11 to 20 are the aberration views of the zoom lenses according to the examples 1 to 10, in which the spherical aberration, astigmatism, distortion aberration (distortion), and lateral chromatic aberration at the wide-angle end, the middle position and the telescopic end are indicated when the object distance (distance on the optical axis from the lens on the closest object side to the object) is 15 m. In each aberration view, the aberration is indicated where the d-line (wavelength 587.6 nm) is reference wavelength. In the spherical aberration view and the lateral chromatic aberration view, the aberrations for the C-line (wavelength 656.3 nm), g-line (wavelength 436 nm) and near infrared radiation (wavelength 880 nm) are also indicated. FNo along the longitudinal axis in the spherical aberration view denotes F number, and ω along the longitudinal axis in other aberration views denotes the half angle of view.

From FIGS. 11 to 20, it can be found that the zoom lenses of the examples 1 to 10 are excellently corrected for aberration to the d-line, C-line, g-line and wavelength 880 nm at the wide-angle end, middle position and telescopic end. That is, a phenomenon that the residual secondary spectrum of longitudinal chromatic aberration abruptly increases near the telescopic end at the time of variable power, which was in the related art problematical, is not seen in the zoom lenses of the examples. The zoom lenses of the examples have a smaller size and a high variable power ratio of 20 times or more, and the chromatic aberration correction for the secondary spectrum, in addition to the primary achromatic, is excellently performed over the entire area of variable power. The height of the chromatic aberration correction effect for the zoom lenses of the examples is that the absolute value of chromatic aberration is small and the variation amount is extremely small, whereby the excellent state is maintained over the wide band from the g-line (wavelength 436 nm) to the C-line (wavelength 656.3 nm) in the visible radiation region and further to the infrared radiation region, as seen in FIGS. 11 to 20.

Figure 22:
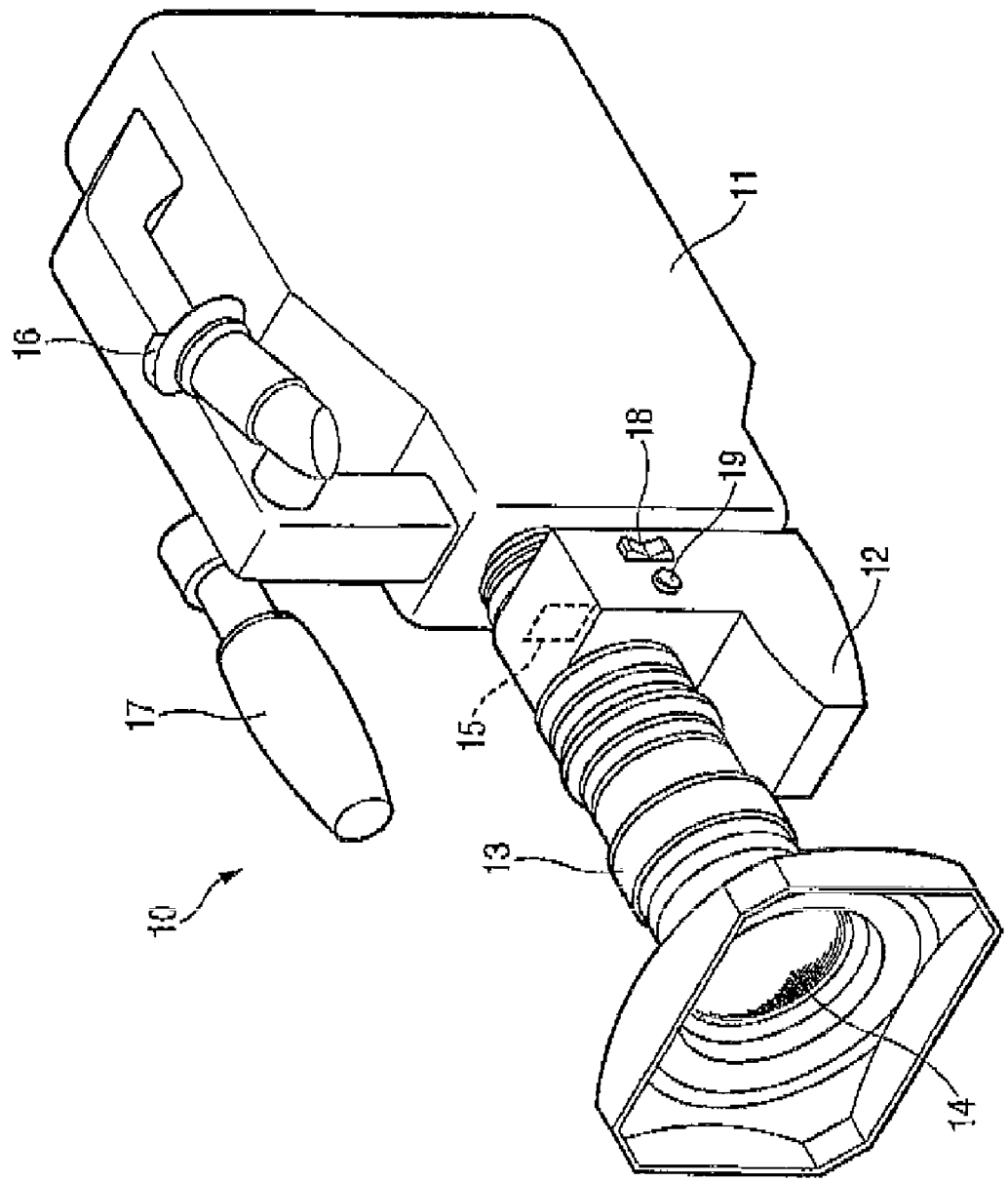
FIG. 22 is a perspective view of an imaging device according to an embodiment of the invention.

Next, an imaging device according to the embodiment of the invention will be described below. FIG. 22 is a perspective view of a television camera 10 that is an imaging device according to one embodiment of the invention. The television camera 10 comprises a lens barrel 13 via an operation unit 12 in the long axis direction of a camera body 11, and the zoom lens 14 according to the embodiment disposed inside it, as shown in FIG. 22. An image pickup surface of an image pickup device 15 such as a CCD or CMOS is located on an image formation surface of the zoom lens 14. Also, a viewfinder 16 and a highly directional microphone 17 are provided rotatably on the upper part of the camera body 11. Also, a zoom lever 18 and an auto focus switch 19 are provided on the side surface of the operation unit 12.

As described above, since the zoom lens 14 according to the embodiment of the invention has a small size and a high variable power ratio, and various kinds of aberration, including the chromatic aberration, are excellently corrected, the television camera 10 mounted with the zoom lens 14 can be constructed in small size, has a function of high variable power ratio, and can form a clear image on the image pickup surface of the image pickup device 15.

Though the invention has been described above in connection with the embodiment and the examples, the invention is not limited to the embodiment and the examples as described above, but various variations may be made thereto. For example, the values of the radius of curvature, on-axis surface spacing, and refractive index of each lens component are not limited to those as indicated in the above numerical examples, but may take other values.

The characteristic constitution of the invention resides particularly in the first group G1, the constitution of the other group is not limited to those as shown in the embodiment and the drawings, and the number of lenses and the lens shape may be configured in other ways.

For example, the zoom lens having the first group G1 that is the stationary group at the time of variable power, the second group G2 having a negative refractive power and being moved to make the variable power, the third group G3 having a positive or negative refractive power and being moved to correct the focal position variation caused by the movement of the second group G2, and the fourth group comprising the aperture diaphragm St and being a relay lens group that is fixed at the time of variable power has been exemplified in the above embodiment, but the zoom lens of the invention is not limited to this constitution. The invention may be also applicable to the zoom lens having at least the first group that is the stationary group at the time of variable power, the second group having a negative refractive power and being moved to make the variable power, the third group comprising the aperture diaphragm and fixed at the time of variable power, and the fourth group having a positive refractive power and being moved to correct the focal position variation caused by the movement of the second group or achieve in-focus by changing the object distance in order from an object side, for example.

Though the television camera has been exemplified above as the imaging device in the above embodiment, the invention is not limited to this imaging device, but may be also applicable to other imaging devices such as a video camera or a surveillance camera.

With the invention, since the shape of each lens, the number and arrangement of lenses and the power arrangement within the stationary group are suitably set, the refractive power of each lens can be suitably allocated, whereby it is possible to provide a zoom lens and an imaging device having the zoom lens which has a small size, a high variable power ratio, and a small residual secondary spectrum of longitudinal chromatic aberration, and retains the high optical performance.

The entire disclosure of each and every foreign patent application from which the benefit of foreign priority has been claimed in the present application is incorporated herein by reference, as if fully set forth.

What is claimed is:

1. A zoom lens comprising:
a first group that includes at least one lens which is stationary at the time of variable power; and
a variable power group, disposed on an image side of the first group, that makes a variable power operation by moving in an optical axis direction at the time of variable power,
wherein the first group comprises:
a first lens group including a negative meniscus lens and a positive lens and having a positive refractive power as a whole; and
a second lens group, disposed on the image side of the first lens group, including: a negative lens group including a negative meniscus lens and a positive lens; and a positive lens group including at least one positive lens, in order from an object side, the second lens group having a positive refractive power as a whole.

2. The zoom lens according to claim 1,
wherein an average value vn of Abbe numbers to the d-line of all the negative lenses in the first group and an average value vp of Abbe numbers to the d-line of all the positive lenses in the first group satisfy the following conditional expressions (1) and (2), $$vn > 40 \quad (1)$$

$$vp > 70 \quad (2).$$

3. The zoom lens according to claim 2,
wherein a focal length f1 of the first lens group and a focal length f2 of the second lens group satisfy the following conditional expression (3), $$0.7 < f1/f2 < 4.2 \quad (3).$$

4. The zoom lens according to claim 3,
wherein an average value vn of Abbe numbers to the d-line of all the negative lenses in the first group and an average value vp of Abbe numbers to the d-line of all the positive lenses in the first group satisfy the following conditional expression (4), $$vn + vp > 119 \quad (4).$$

5. The zoom lens according to claim 4,
wherein focus from an infinite distance object to a closest focusing distance object is achieved by moving only the second lens group of the first group in the optical axis direction.

6. An imaging device comprising:
the zoom lens according to claim 5; and
an image pickup device that picks up an image of a subject formed by the zoom lens.

7. The zoom lens according to claim 1, wherein a focal length f1 of the first lens group and a focal length f2 of the second lens group satisfy the following conditional expression (3), $$0.7 < f1/f2 < 4.2 \quad (3).$$

8. The zoom lens according to claim 7,
wherein an average value vn of Abbe numbers to the d-line of all the negative lenses in the first group and an average value vp of Abbe numbers to the d-line of all the positive lenses in the first group satisfy the following conditional expression (4), $$vn + vp > 119 \quad (4).$$

9. The zoom lens according to claim 8,
wherein focus from an infinite distance object to a closest focusing distance object is achieved by moving only the second lens group of the first group in the optical axis direction.

10. The zoom lens according to claim 1,
wherein an average value vn of Abbe numbers to the d-line of all the negative lenses in the first group and an average value vp of Abbe numbers to the d-line of all the positive lenses in the first group satisfy the following conditional expression (4), $$vn + vp > 119 \quad (4).$$

11. The zoom lens according to claim 10,
wherein focus from an infinite distance object to a closest focusing distance object is achieved by moving only the second lens group of the first group in the optical axis direction.

12. The zoom lens according to claim 1,
wherein focus from an infinite distance object to a closest focusing distance object is achieved by moving only the second lens group of the first group in the optical axis direction.

13. An imaging device comprising:
the zoom lens according to claim 1; and
an image pickup device that picks up an image of a subject formed by the zoom lens.

* * * * *